US008765316B2

(12) United States Patent
Naganuma et al.

(10) Patent No.: US 8,765,316 B2
(45) Date of Patent: Jul. 1, 2014

(54) FUEL CELL SYSTEM

(75) Inventors: Yoshiaki Naganuma, Toyota (JP);
Hiromi Tanaka, Toyota (JP); Osamu Yumita, Seto (JP); Nobukazu Mizuno, Miyoshi (JP); Yuichi Sakajo, Toyohashi (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/643,453

(22) PCT Filed: Apr. 27, 2010

(86) PCT No.: PCT/JP2010/003000
§ 371 (c)(1),
(2), (4) Date: Oct. 25, 2012

(87) PCT Pub. No.: WO2011/135610
PCT Pub. Date: Nov. 3, 2011

(65) Prior Publication Data
US 2013/0040219 A1    Feb. 14, 2013

(51) Int. Cl.
*H01M 8/04* (2006.01)
(52) U.S. Cl.
CPC ...... *H01M 8/04014* (2013.01); *H01M 2250/20* (2013.01); *H01M 8/04589* (2013.01); *H01M 2250/405* (2013.01); *H01M 8/04067* (2013.01); *H01M 8/04268* (2013.01); *H01M 8/04559* (2013.01); *Y02B 90/16* (2013.01); *Y02E 60/50* (2013.01); *H01M 8/04731* (2013.01); *H01M 8/04753* (2013.01); *H01M 8/04738* (2013.01); *H01M 8/0494* (2013.01); *Y02T 90/32* (2013.01); *H01M 8/04992* (2013.01)
USPC ........................................................ 429/429

(58) Field of Classification Search
None
See application file for complete search history.

(56) References Cited

U.S. PATENT DOCUMENTS

2001/0028970 A1* 10/2001 Sano et al. ...................... 429/22
2007/0059569 A1*  3/2007 Matsumoto et al. ............ 429/22
(Continued)

FOREIGN PATENT DOCUMENTS

JP   2004-179123 A    6/2004
JP   2008-269813 A   11/2008
(Continued)

OTHER PUBLICATIONS

Manabe et al., WO 2009/017139, Fuel Cell System and its Control Method, Feb. 5, 2009, Cover Page.*
(Continued)

*Primary Examiner* — Patrick Ryan
*Assistant Examiner* — Jose Colucci Rios
(74) *Attorney, Agent, or Firm* — Kenyon & Kenyon LLP

(57) ABSTRACT

A fuel cell system includes a fuel cell, an operation controller and an air-conditioning mechanism. In response to a heating request for the air-conditioning mechanism during ordinary operation where the fuel cell is operated at an operating point on a current-voltage characteristic curve of the fuel cell, the operation controller compares a heat value-based required current value with an output-based required current value. When the output-based required current value is equal to or greater than the heat value-based required current value, the operation controller causes the fuel cell to be operated at an operating point on the current-voltage characteristic curve. When the output-based required current value is smaller than the heat value-based required current value, the operation controller controls the operating point of the fuel cell to an operating point of lower power generation efficiency than that of the operating point on the current-voltage characteristic curve.

5 Claims, 10 Drawing Sheets

(56) References Cited

U.S. PATENT DOCUMENTS

| | | | |
|---|---|---|---|
| 2009/0098426 A1* | 4/2009 | Tsuchiya et al. | 429/23 |
| 2010/0203409 A1* | 8/2010 | Manabe et al. | 429/431 |

FOREIGN PATENT DOCUMENTS

| | | |
|---|---|---|
| JP | 2009-032605 A | 2/2009 |
| JP | 2009-054465 A | 3/2009 |
| JP | 2009-140696 A | 6/2009 |
| WO | 2007/046545 A1 | 4/2007 |

OTHER PUBLICATIONS

Manabe et al., WO 2009/017139, Fuel Cell System and its Control Method, Feb. 5, 2009, Machine translation to English from Japanese.*

International Search Report issued Jul. 20, 2010 in PCT/JP2010/003000.

* cited by examiner

Fig.2
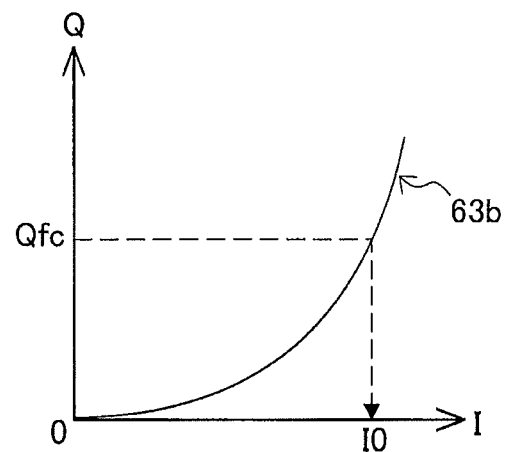
<I-Q MAP>
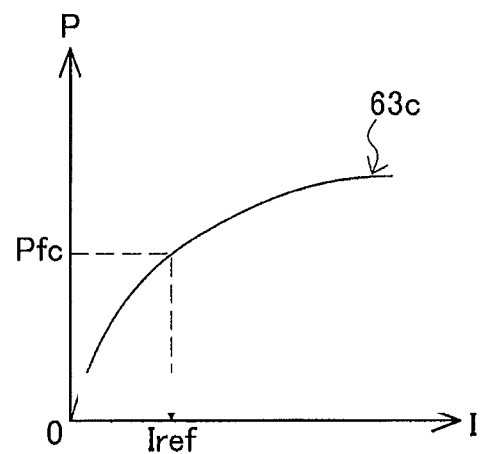
<I-P MAP>

Fig.5
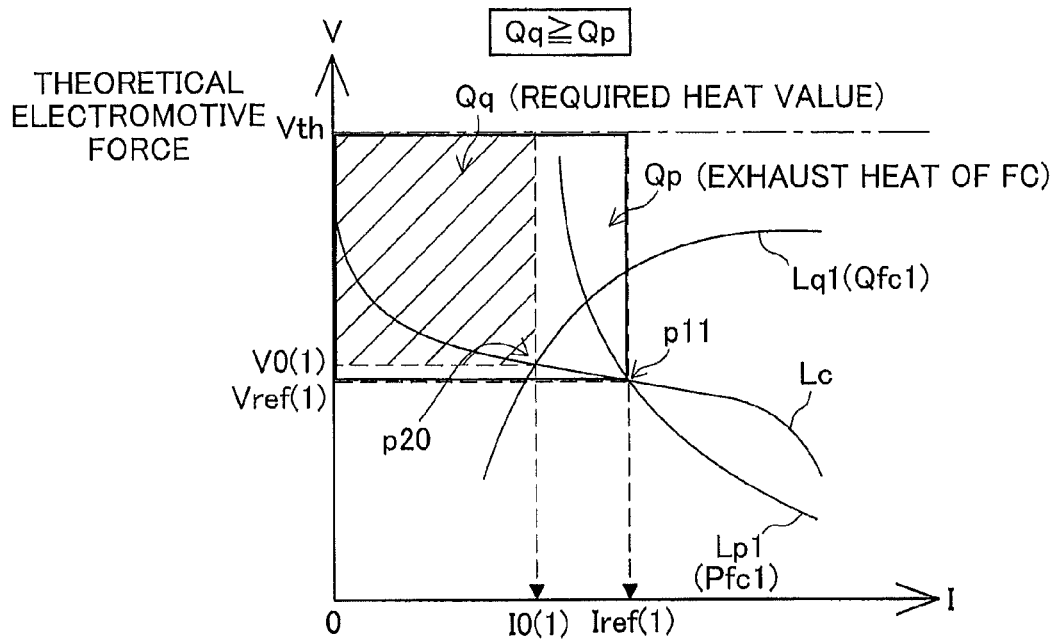
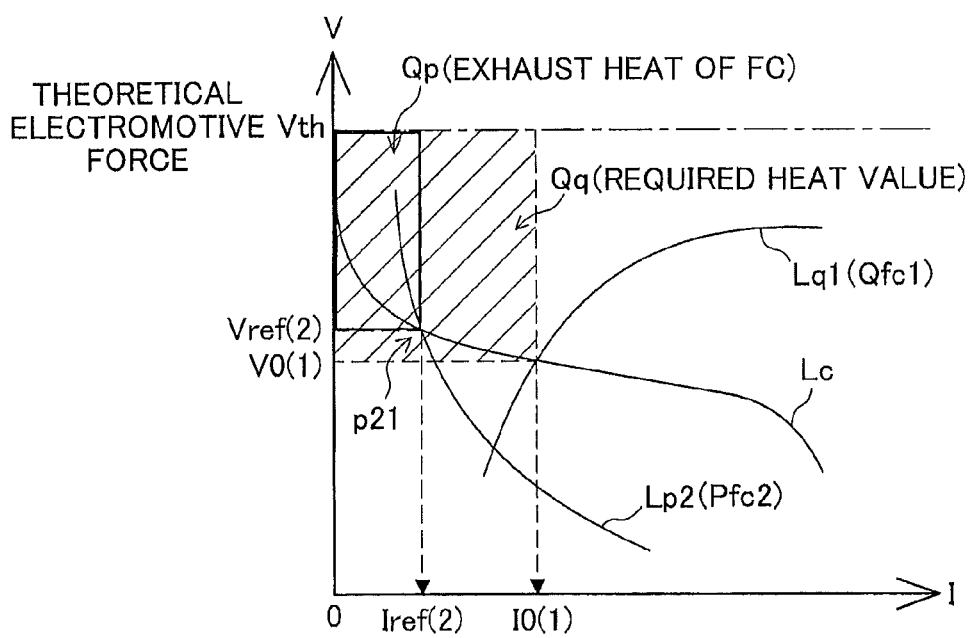

FUEL CELL SYSTEM

This is a 371 national phase application of PCT/JP2010/003000 filed 27 Apr. 2010, the contents of which are incorporated herein by reference.

FIELD OF THE INVENTION

The present invention relates to using the exhaust heat of a fuel cell.

BACKGROUND OF THE INVENTION

One proposed technique to ensure the operation stability of a fuel cell at a low-temperature start performs operation for power generation of the fuel cell at a lower efficiency (hereinafter referred to as "low-efficiency operation") than that during ordinary operation to increase the heat loss (exhaust heat) of the fuel cell and raise the temperature of the fuel cell by the exhaust heat.

SUMMARY

Technical Problem

When the low-efficiency operation is performed during ordinary operation to use the heat generated by the low-efficiency operation for heating, the lowered power generation efficiency to satisfy the required heat value for heating may not fulfill the required output (electric power) and may lower the output responsiveness. On the contrary, fulfilling the required output may not satisfy the required heat value and may lower the thermogenic responsiveness. Additionally, in a system using hydrogen gas and the air as reaction gases, the low efficiency operation causes hydrogen gas to be produced at the cathodes. There is accordingly a need to dilute the produced hydrogen gas with the air. The method of successively calculating the amount of the air required for such dilution and the amount of the air required for the anodes during ordinary operation and controlling the respective supply amounts of the air undesirably complicates the processing of regulating the amount of the air and may lower the output responsiveness and the thermogenic responsiveness.

The object of the invention is to improve the output responsiveness and the thermogenic responsiveness to heating during ordinary operation in a fuel cell system configured to utilize the exhaust heat of a fuel cell for heating.

Solution to Problem

In order to achieve at least part of the foregoing, the invention provides various aspects and embodiments described below.

[Aspect 1] A fuel cell system comprises: a fuel cell; an operation controller configured to control operation of the fuel cell; and an air-conditioning mechanism configured to execute heating by using exhaust heat of the fuel cell, wherein in response to a heating request for the air-conditioning mechanism during ordinary operation where the fuel cell is operated at an operating point on a current-voltage characteristic curve of the fuel cell, the operation controller compares a heat value-based required current value with an output-based required current value, wherein the heat value-based required current value is a current value of an operating point that is located on the current-voltage characteristic curve and satisfies a required heat value for the fuel cell, wherein the output-based required current value is a current value of an operating point that is located on the current-voltage characteristic curve and satisfies a required output for the fuel cell, when the output-based required current value is equal to or greater than the heat value-based required current value, the operation controller causes the fuel cell to be operated at an operating point on the current-voltage characteristic curve, and when the output-based required current value is smaller than the heat value-based required current value, the operation controller performs operation-for-heating control that controls operating point of the fuel cell to an operating point of lower power generation efficiency than that of the operating point on the current-voltage characteristic curve of the fuel cell.

When the output-based required current value is equal to or greater than the heat value-based required current value, the fuel cell system according to the aspect 1 controls the operating point of the fuel cell to be located on the current-voltage characteristic curve. This enhances the output and simplifies the processing, compared with the configuration of controlling the operating point of the fuel cell to an operating point of lower power generation efficiency (i.e., higher heat generation efficiency) than that on the current-voltage characteristic curve. This accordingly improves the output responsiveness. Additionally, when the output-based required current value is equal to or greater than the heat value-based required current value, the amount of exhaust heat of the fuel cell at the operating point on the current-voltage characteristic curve is greater than the required heat value. Adopting the configuration of the aspect 1 enables the amount of heat by the heating request to be satisfied by the exhaust heat of the fuel cell, thus improving the thermogenic responsiveness. When the output-based required current value is smaller than the heat value-based required current value, the operating point of the fuel cell is controlled to the operating point of the lower power generation efficiency (i.e., the higher heat generation efficiency) than that on the current-voltage characteristic curve. This enables the amount of heat by the heating request to be satisfied by the exhaust heat of the fuel cell.

[Aspect 2] The fuel cell system according to aspect 1, further comprising: an oxidizing gas supplier configured to supply an oxidizing gas used for power generation of the fuel cell to the fuel cell; an oxidizing gas supply line configured to connect the oxidizing gas supplier with the fuel cell; a cathode off-gas exhaust line configured to discharge cathode off-gas from the fuel cell; a bypass line configured to connect the oxidizing gas supply line with the cathode off-gas exhaust line; and a flow control valve configured to regulate a flow rate ratio of a flow rate of the oxidizing gas flowing through the oxidizing gas supply line to the fuel cell to a flow rate of the oxidizing gas flowing through the oxidizing gas supply line to the bypass line out of the oxidizing gas supplied from the oxidizing gas supplier, wherein the operation controller performs the operation-for-heating control that fixes a supply amount of the oxidizing gas by the oxidizing gas supplier to a supply amount to satisfy the output-based required current value and adjusts the flow control valve to shift the operating point of the fuel cell to a required operating point that is an operating point satisfying both the required heat value and the required output.

The fuel cell system of this aspect fixes the supply amount of the oxidizing gas by the oxidizing gas supplier, thus limiting the influence of the responsiveness of the oxidizing gas supplier. This accordingly restricts potential decreases of the output responsiveness and the thermogenic responsiveness even when the oxidizing gas supplier has low responsiveness. The fixed supply amount of the oxidizing gas is set to the supply amount to satisfy the output-based required current value. This simultaneously satisfies the requirement of narrowing the current range for the operation for heating and the requirement of limiting the amount of increase in supply amount of the oxidizing gas by the oxidizing gas supplier in a shift of the operation of the fuel cell from the operation for heating to the ordinary operation.

[Aspect 3] The fuel cell system according to aspect 2, further comprising: an ammeter configured to measure a current value of the fuel cell, wherein at a start of the operation-for-heating control, the operation controller adjusts the flow control valve to supply a lower flow rate of the oxidizing gas, which is lower than a flow rate of the oxidizing gas to satisfy a current value of the required operating point out of the oxidizing gas supplied by the oxidizing gas supplier, to the fuel cell, when the current value of the fuel cell measured by the ammeter is greater than the current value of the required operating point, the operation controller then adjusts the flow control valve to decrease the flow rate of the oxidizing gas supplied to the fuel cell, and when the current value of the fuel cell measured by the ammeter is smaller than the current value of the required operating point, the operation controller then adjusts the flow control valve to increase the flow rate of the oxidizing gas supplied to the fuel cell.

Even when the operating point of the fuel cell is not located on the current-voltage characteristic curve and when the flow rate of the oxidizing gas actually required for the operation for heating is accordingly different from the flow rate of the oxidizing gas to satisfy the current value of the required operating point, the fuel cell system of this aspect varies the flow rate of the oxidizing gas to make the current value of the fuel cell measured by the ammeter equal to the current value of the required operating point. This enables an adequate amount of the oxidizing gas to be supplied to the fuel cell.

[Aspect 4] The fuel cell system according to any one of aspects 1 to 3, further comprising: a fuel cell temperature acquirer configured to acquire temperature of the fuel cell; and a heating space temperature acquirer configured to acquire heating space temperature that is temperature of a space as heating target by the air-conditioning mechanism, wherein at a start of the fuel cell, the operation controller performs start-time warm-up operation control that is control to lower the power generation efficiency of the fuel cell than that in the operation-for-heating control, the operation controller has a first operation-for-heating mode that, in response to a heating request for the air-conditioning mechanism during the start-time warm-up operation control, terminates the start-time warm-up operation control, when the heating space temperature reaches a temperature to satisfy the heating request after the temperature of the fuel cell reaches a predetermined warm-up end temperature, after termination of the start-time warm-up operation control, the operation controller compares the heat value-based required current value with the output-based required current value, when the output-based required current value is equal to or greater than the heat value-based required current value, the operation controller controls the fuel cell to be operated at an operating point on the current-voltage characteristic curve, and when the output-based required current value is smaller than the heat value-based required current value, the operation controller performs the operation-for-heating control.

The fuel cell system of this aspect continues the first operation-for-heating mode until the heating space temperature reaches the temperature to satisfy the heating request. This enables the heating space temperature to be raised within a shorter period of time. When the heating space temperature reaches the temperature to satisfy the heating request, the fuel cell system of this aspect controls the operating point of the fuel cell to the operating point on the current-voltage characteristic curve or otherwise performs the operation-for-heating control. This obtains the output to satisfy both the required heat value and the required output, thus improving the output responsiveness and the thermogenic responsiveness.

[Aspect 5] The fuel cell system according to aspect 4, further comprising: a user interface, wherein in addition to the first operation-for-heating mode, the operation controller has a second operation-for-heating mode that, in response to the heating request for the air-conditioning mechanism during the start-time warm-up operation control, terminates the start-time warm-up operation control when the temperature of the fuel cell reaches the warm-up end temperature, and the user interface enables a user to select the operation-for-heating mode performed by the operation controller between the first operation-for-heating mode and the second operation-for-heating mode.

The fuel cell system of this aspect enables the user to use the user interface and set either the first operation-for-heating mode or the second operation-for-heating mode as the operation-for-heating mode during the start-time warm-up operation control. Setting the first operation-for-heating mode may enable the vehicle interior temperature to be raised within a shorter period of time at the start of the fuel cell system. Setting the second operation-for-heating mode may restrict potential decreases of the fuel efficiency and the output responsiveness at the start of the fuel cell system.

BRIEF DESCRIPTION OF DRAWINGS

FIG. 2 schematically illustrates the I-Q map and the I-P map shown in FIG. 1;

FIG. 5 illustrates the relationship between the required heat value and the exhaust heat of the fuel cell stack;

DETAILED DESCRIPTION

A. First Embodiment

A1. System Configuration

Figure 1:
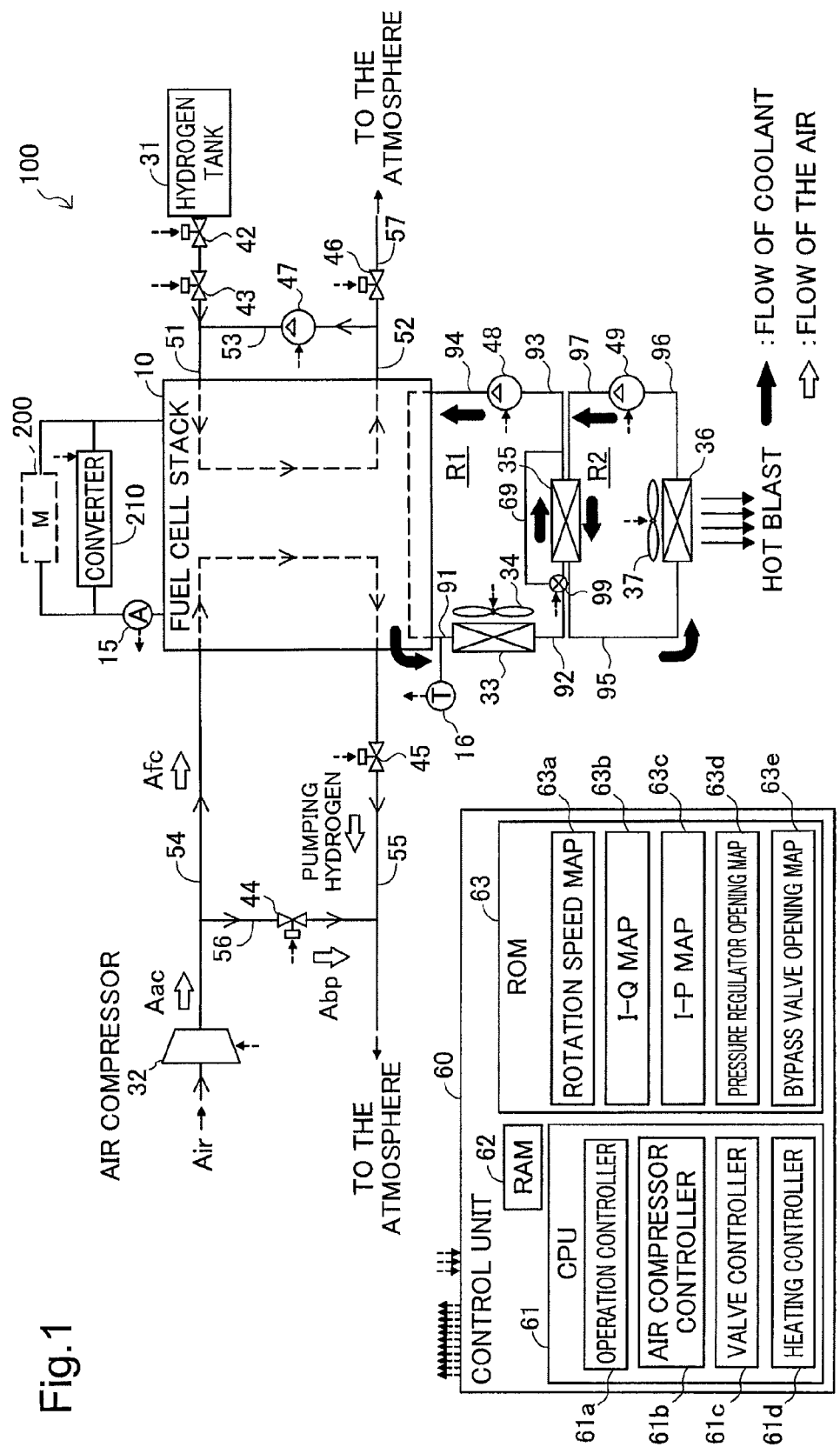
FIG. 1 schematically illustrates the configuration of a fuel cell system according to one embodiment of the invention.

FIG. 1 schematically illustrates the configuration of a fuel cell system according to one embodiment of the invention. According to this embodiment, the fuel cell system 100 is used to supply driving power and is mounted on an electric vehicle. The fuel cell system 100 includes a fuel cell stack 10, a hydrogen gas supply line 51, an anode off-gas exhaust line 52, a hydrogen gas bypass line 53, an air supply line 54, a cathode off-gas exhaust line 55, an air bypass line 56, a hydrogen tank 31, a shut-off valve 42, a hydrogen gas supply valve 43, a purge valve 46, a circulation pump 47, an air compressor 32, a pressure regulator 45, a bypass valve 44, a first coolant circulation path R1, a coolant bypass line 69, a temperature sensor 16, a radiator 33, a first power-driven fan 34, a first coolant pump 48, a heat exchange unit 35, a three-way valve 99, a second coolant circulation path R2, a heater core 36, a second power-driven fan 37, a second coolant pump 49, a DC-DC converter 210, an ammeter 15 and a control unit 60.

The fuel cell stack 10 is a polymer electrolyte fuel cell structured by stacking a plurality of unit cells including MEAs (membrane electrode assemblies) and generates electromotive force by electrochemical reaction of pure hydrogen as an anode gas with oxygen contained in the air as a cathode gas on respective electrodes.

The hydrogen gas supply line 51 is provided as a flow path that connects the hydrogen tank 31 with the fuel cell stack 10 and leads hydrogen gas supplied from the hydrogen tank 31 to the fuel cell stack 10. The anode off-gas exhaust line 52 is provided as a flow path that discharges anode off-gas (excess hydrogen gas) from anodes of the fuel cell stack 10. The hydrogen gas bypass line 53 is provided as a flow path that connects the anode off-gas exhaust line 52 with the hydrogen gas supply line 51 and returns the remaining hydrogen (hydrogen gas unconsumed by the reaction) discharged from the fuel cell stack 10 to the hydrogen gas supply line 51.

The air supply line 54 is provided as a flow path that connects the air compressor 32 with the fuel cell stack 10 and leads the compressed air supplied from the air compressor 32 to the fuel cell stack 10. The cathode off-gas exhaust line 55 is provided as a flow path that discharges cathode off-gas from cathodes of the fuel cell stack 10. In the ordinary operating state, the cathode off-gas includes the excess air unconsumed by the electrochemical reaction in the fuel cell stack 10 and water produced by the electrochemical reaction in the fuel cell stack 10. In the low-efficiency operating state, the cathode off-gas includes hydrogen produced by chemical reaction shown by Equation 1 given below in the cathode during low-efficiency operation (hereinafter called "pumping hydrogen"), in addition to the excess air and the produced water:

[Math. 1]

$$2H^+ + 2e^- \rightarrow H_2 \quad (1)$$

The air bypass line 56 is provided as a flow path that connects the air supply line 54 with the cathode off-gas exhaust line 55 and leads the air supplied from the air compressor 32 to the cathode off-gas exhaust line 55 without passing through the fuel cell stack 10.

The hydrogen tank 31 stores high-pressure hydrogen gas. The shut-off valve 42 is located at a hydrogen gas discharge port (not shown) of the hydrogen tank 31 to allow and stop the supply of hydrogen gas. The hydrogen gas supply valve 43 is located in the hydrogen gas supply line 51, and the pressure and the flow rate of hydrogen gas supplied to the fuel cell stack 10 are controlled by adjusting the valve opening. The purge valve 46 is operated to mix (dilute) the anode off-gas with the air and releases the gas mixture to the atmosphere. The circulation pump 47 is operated to make the flow of hydrogen gas through the hydrogen gas bypass line 53 from the anode off-gas exhaust line 52 to the hydrogen gas supply line 51.

The air compressor 32 is located in the air supply line 54 to compress the external intake air and supply the compressed air to the fuel cell stack 10. The air compressor 32 may be, for example, a centrifugal compressor that performs compression by rotation of an impeller or an axial compressor that performs compression by rotation of a rotor vane (rotor). The pressure regulator 45 is operated to regulate the pressure (back pressure) on the fuel cell stack 10. The bypass valve 44 is operated to regulate the amount of the air flowing through the air bypass line 56 from the air supply line 54 to the cathode off-gas exhaust line 55.

The first coolant circulation path R1 is provided as a flow path that circulates pure water as the coolant to release heat generated during power generation of the fuel cell stack 10 (exhaust heat) by the radiator 33 and the heat exchange unit 35. The first coolant circulation path R1 includes a first coolant line 91, a second coolant line 92, a third coolant line 93 and a fourth coolant line 94.

The first coolant line 91 connects the fuel cell stack 10 with the radiator 33 and leads the coolant discharged from the fuel cell stack 10 to the radiator 33. The second coolant line 92 connects the radiator 33 with the heat exchange unit 35 and the coolant bypass line 69 and leads the coolant discharged from the radiator 33 to either the heat exchange unit 35 or the coolant bypass line 69. The third coolant line 93 connects the heat exchange unit 35 and the coolant bypass line 69 with the first coolant pump 48. The fourth coolant line 94 connects the first coolant pump 48 with the fuel cell stack 10 and supplies the coolant fed by the first coolant pump 48 to the fuel cell stack 10.

The coolant bypass line 69 connects the second coolant line 92 with the third coolant line 93 and leads the coolant from the second coolant line 92 to the third coolant line 93 without passing through the heat exchange unit 35. The temperature sensor 16 is located in the vicinity of the fuel cell stack 10 in the first coolant line 91. According to this embodiment, the temperature detected by the temperature sensor 16 is employed as the representative temperature of the fuel cell stack 10. The radiator 33 is provided in the first coolant line 91. The first power-driven fan 34 is located near the radiator 33 to blow the air toward the radiator. The first coolant pump 48 makes the flow of coolant from the third coolant line 93 to the fourth coolant line 94. The heat exchange unit 35 makes heat exchange between the heat of the coolant flowing through the second coolant line 92 and the heat of the coolant flowing through a seventh coolant line 97.

The three-way valve 99 is operated to lead the coolant discharged from the radiator 33 (i.e., coolant flowing through the second coolant line 92) to one of the heat exchange unit 35 and the coolant bypass line 69. In the fuel cell system 100, the three-way valve 99 controls the presence or the absence of thermal linkage (exchange of heat via the coolant) between the first coolant circulation path R1 and the second coolant circulation path R2. More specifically, the three-way valve 99 is used to lead the coolant flowing through the second coolant line 92 to the heat exchange unit 35, so as to allow the thermal linkage between the first coolant circulation path R1 and the second coolant circulation path R2. The three-way 99 is also used to lead the coolant flowing through the second coolant line 92 to the coolant bypass line 69, so as to prohibit the thermal linkage between the first coolant circulation path R1 and the second coolant circulation path R2.

The second coolant circulation path R2 is provided as a flow path that circulates pure water as the coolant to supply the heat obtained by the heat exchange unit 35 to the heater core 36. The second coolant circulation path R2 includes a fifth coolant line 95, a sixth coolant line 96 and the seventh coolant line 97. The fifth coolant line 95 connects the heat exchange unit 35 with the heater core 36 and supplies the coolant discharged from the heat exchange unit 35 to the heater core 36. The sixth coolant line 96 connects the heater core 36 with the second coolant pump 49 and leads the coolant discharged from the heater core 36 to the second coolant pump 49. The seventh coolant line 97 connects the second coolant pump 49 with the heat exchange unit 35 and supplies the coolant fed by the second coolant pump 49 to the heat exchange unit 35.

The heater core 36 works as a heat exchange unit for heating and has temperature rise by the heat of the coolant flowing through the second coolant circulation path R2. The second power-driven fan 37 blows the air toward the heater core 36, so as to blow the hot air heated by the heater core 36 toward the vehicle interior (not shown). The second coolant pump 49 makes the flow of coolant from the sixth coolant line 96 to the seventh coolant line 97.

The DC-DC converter 210 is electrically connected with the fuel cell stack 10 and a motor 200 as a load and controls the output voltage of the fuel cell stack 10. The ammeter 15 is used to measure the current value of the fuel cell stack 10.

The control unit 60 is electrically connected with the air compressor 32, the DC-DC converter 210, the respective power-driven fans 34 and 37, the respective pumps 47 to 49 and the respective valves 42 to 46 and 99 and controls these elements. The control unit 60 is also electrically connected with the ammeter 15 and the respective temperature sensor 16 and receives the measured values from these elements.

The control unit 60 includes a CPU (Central Processing Unit) 61, a RAM (Random Access Memory) 62 and a ROM (Read Only Memory) 63. A control program (not shown) for controlling the fuel cell system 100 is stored in the ROM 63. The CPU 61 executes this control program with using the RAM 62, so as to serve as an operation controller 61a, an air compressor controller 61b, a valve controller 61c and a heating controller 61d.

The operation controller 61a adjusts the amounts of reaction gases (the air and hydrogen gas) supplied to the fuel cell stack 10 and the voltage of the fuel cell stack 10, so as to control the power output by the fuel cell stack 10. Controlling the DC-DC converter 210 enables such voltage adjustment of the fuel cell stack 10. The amount of the air is adjustable by regulating the rotation speed of the air compressor 32 via the air compressor controller 61b. The amount of hydrogen gas is adjustable by regulating the opening of the hydrogen gas supply valve 43 via the valve controller 61c. The operation controller 61a also computes a required output value for the fuel cell stack 10, based on the accelerator opening and the vehicle speed (not shown).

The air compressor controller 61b regulates the rotation speed of the air compressor 32 to adjust the amount of the air supplied to the fuel cell stack 10. The valve controller 61 regulates the openings of the respective valves 42 to 46 and 99. The heating controller 61d receives the user's heating request and performs heating control process described later.

A rotation speed map 63a, an I-Q map 63b, an I-P map 63c, a pressure regulator opening map 63d and a bypass valve opening map 63e are stored in the ROM 63. The rotation speed map 63a correlates the rotation speed of the impeller of the air compressor 32 to the amount of the air supplied by the air compressor 32 and may be provided, for example, experimentally to be stored in advance.

FIG. 2 schematically illustrates the I-Q map and the I-P map shown in FIG. 1. The upper drawing of FIG. 2 schematically illustrates the I-Q map 63b, and the lower drawing schematically illustrates the I-P map 63c. The upper drawing of FIG. 2 shows the current value as abscissa and the heat value as ordinate. The lower drawing of FIG. 2 shows the current value as abscissa and the output (amount of electricity) as ordinate.

The I-Q map 63b correlates the required heat value Qfc for the fuel cell stack 10 to the current value I0 of the fuel cell stack 10 required to fulfill the required heat value Qfc (hereinafter referred to as "heat value-based required current value). The I-P map 63c correlates the required output Pfc for the fuel cell stack 10 to the current value Iref of the fuel cell stack 10 required to fulfill the required output Pfc (hereinafter referred to as "output-based required current value").

Figure 3:
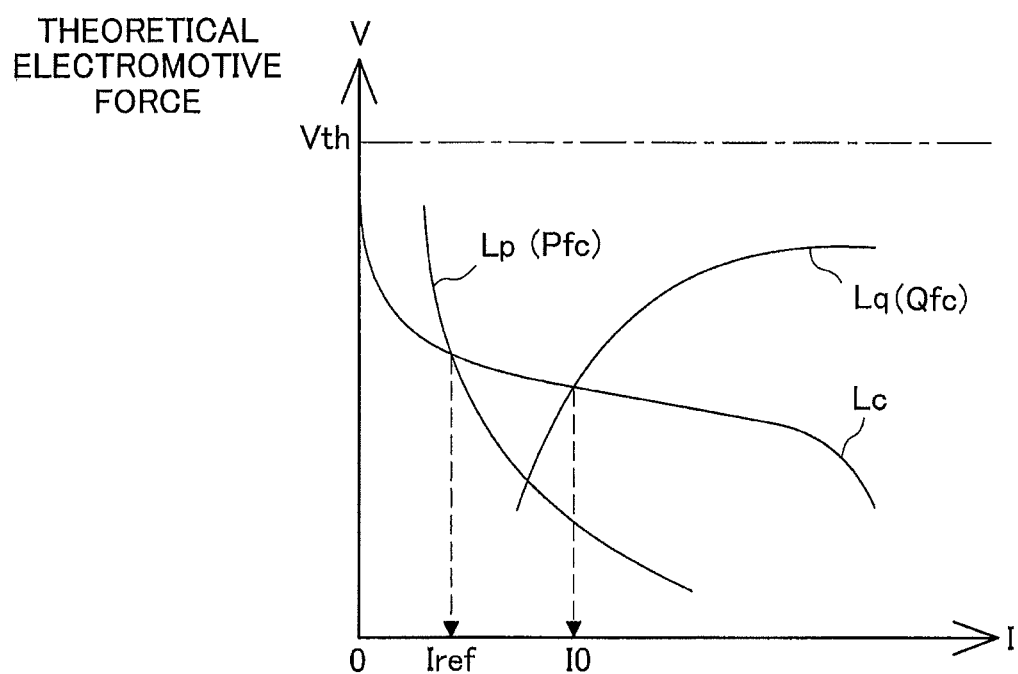
FIG. 3 schematically illustrates a method of setting the I-Q map and the I-P map.

FIG. 3 schematically illustrates a method of setting the I-Q map and the I-P map. FIG. 3 shows the current value of the fuel cell stack 10 as abscissa and the voltage value of the fuel cell stack 10 as ordinate. A curve Lc in FIG. 3 is an I-V characteristic curve (current-voltage characteristic curve) of the fuel cell stack 10. A curve Lq is an equal heat generation curve with respect to a certain required heat value Qfc. A curve Lp is an equal output curve with respect to a certain required output Pfc.

As shown in FIG. 3, the current value at the intersection of the equal heat generation curve (curve Lq) with the I-V characteristic curve (curve Lc) corresponds to the heat value-based required current value I0. The current value at the intersection of the equal output curve (curve Lp) with the I-V characteristic curve (curve Lc) corresponds to the output-based required current value Iref. The I-Q map 63b may be set by determining the current value at the intersection of the equal heat generation curve (curve Lq) with the I-V characteristic curve (Lc) with varying the required heat value. Similarly the I-P map 63c may be set by determining the current value at the intersection of the equal output curve (curve Lp) with the I-V characteristic curve (Lc) with varying the required output.

The pressure regulator opening map 63d shown in FIG. 1 is used to determine the opening of the pressure regulator 45. The pressure regulator opening map 63d is set to unequivocally determine the opening of the pressure regulator 45, based on the amount of the air Abp flowing through the bypass valve 44 (hereinafter called "bypass air amount") and the amount of the air Afc supplied to the fuel cell stack 10 (hereinafter called "FC-requiring air amount") out of the amount of the air Aac supplied from the air compressor 32 (hereinafter called "supply air amount"). The bypass valve opening map 63e is used to determine the opening of the bypass valve 44. Like the pressure regulator opening map 63d, the bypass valve opening map 63e is set to unequivocally determine the opening of the bypass valve 44, based on the bypass air amount Abp and the FC-requiring air amount Afc.

In the fuel cell system 100 of the above configuration, in response to a heating request during ordinary operation of the fuel cell stack 10, the heating control process described later is performed to improve the output responsiveness and the thermogenic responsiveness. According to this embodiment, the "ordinary operation" of the fuel cell stack 10 means that the fuel cell stack 10 is operated with sufficient supplies of the reaction gases, such that the operating point of the fuel cell stack 10 is located on the I-V characteristic curve of the fuel cell stack 10. The thermogenic responsiveness means the capability to satisfy the required heat value in response to a heat generation request or the shortness of a time period before fulfillment of the required heat value in response to a heat generation request.

The air compressor 32 described above corresponds to the oxidizing gas supplier in the claims. The bypass valve 44 and the pressure regulator 45 described above correspond to the flow control valve in the claims.

A2. Heating Control Process

Figure 4:
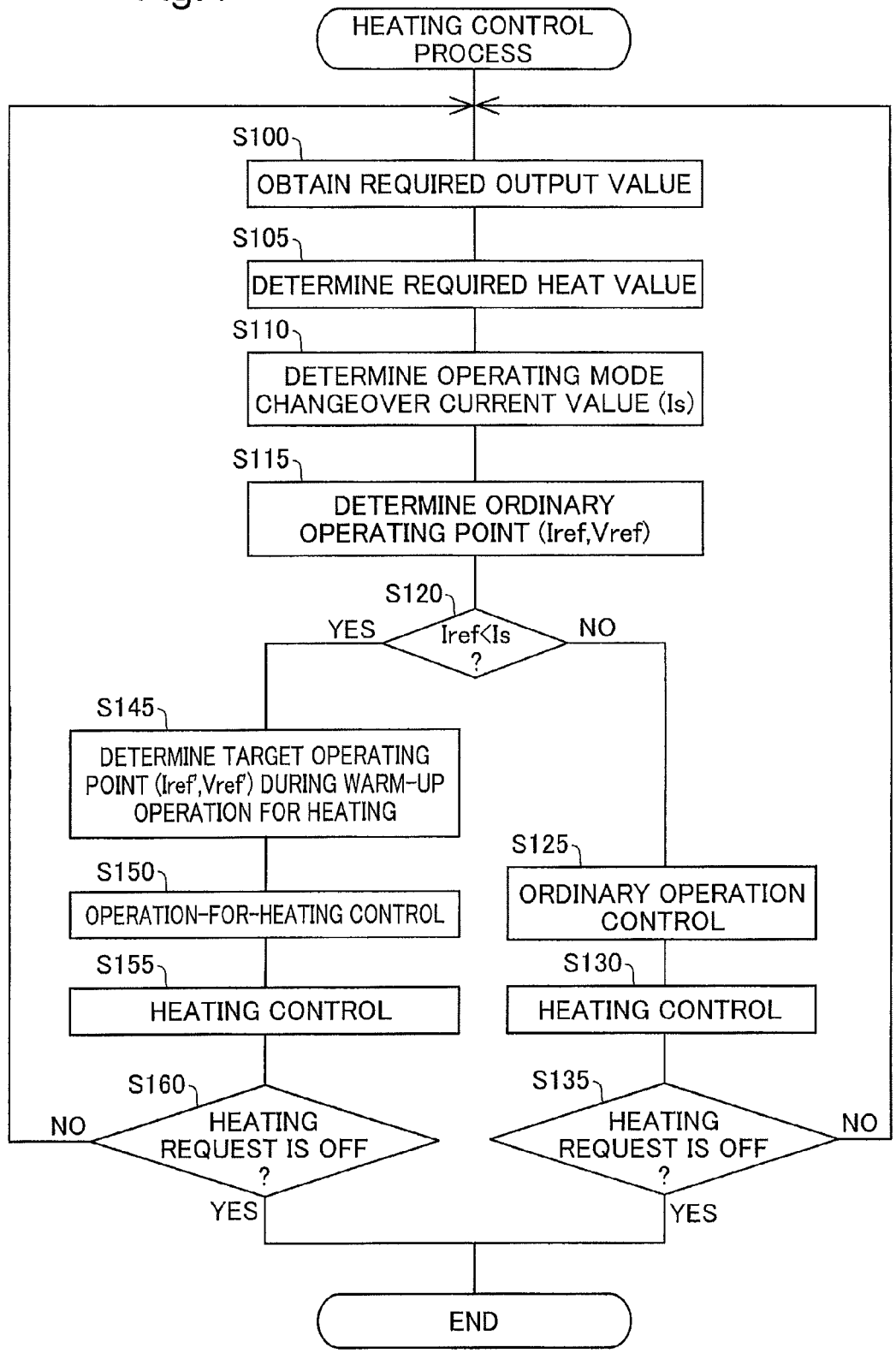
FIG. 4 is a flowchart showing a procedure of heating control process performed in the fuel cell system.

FIG. 4 is a flowchart showing a procedure of heating control process performed in the fuel cell system. The heating control process starts, in response to the user's heating request with specification of a temperature during ordinary operation of the fuel cell system 100. On the start of the heating control process, the first coolant circulation path R1 and the second coolant circulation path R2 are linked with each other.

The heating controller 61d obtains a required output value for the fuel cell stack 10 (step S100). The operation controller 61a computes required energies for the motor 200 and auxiliary machinery (e.g., air compressor 32), based on the accelerator opening and the vehicle speed. The heating controller 61d obtains these required energies as the required output value for the fuel cell stack 10 from the operation controller 61a.

The heating controller 61d determines a required heat value for the fuel cell stack (step S105). The required heat value for the fuel cell stack 10 is given as the sum of the heat value required to raise the temperature of the heater core 36 and the heat value required to maintain the temperature of the fuel cell stack 10. The heat value required to raise the temperature of the heater core 36 is determinable by a known method, based on the user's specified vehicle interior temperature, the outside air temperature, the ventilation rate (utilization rate of the inside air to the outside air), the amount of solar radiation, and the amount of heat release through windows. The heat value required to maintain the temperature of the fuel cell stack 10 is determinable by a known method, based on the temperature of the fuel cell stack 10 and the outside air temperature.

The heating controller 61d determines an operating mode changeover current value Is of the fuel cell stack 10 (step S110). In the fuel cell system 100, an ordinary operating mode and an operation-for-heating mode are provided as the operating modes of the fuel cell stack 10 during the heating control process. The operating mode is changed over according to the current value of the fuel cell stack 10 as described later. The fuel cell system 100 employs the heat value-based required current value I0 as the changeover current value Is. The heating controller 61d thus refers to the I-Q map 63b to determine the changeover current value Is (i.e., heat value-based required current value I0), based on the required heat value Qfc determined at step S105.

The heating controller 61d determines an ordinary operating point (step S115). The ordinary operating point means an operating point defined by the current value of the fuel cell stack 10 to fulfill the required output value (output-based required current value Iref) and the voltage, value of the fuel cell stack 10 to fulfill the required output value (hereinafter referred to as "output-based required voltage value Vref"). The heating controller 61d obtains the required output value from the operation controller 61a, refers to the I-P map 63c to determine the output-based required current value Iref based on the obtained required output value, and divides the required output value by the determined output-based required current value Iref to determine the output-based required voltage value Vref.

The heating controller 61d then determines whether the output-based required current value Iref determined at step S115 is smaller than the changeover current value Is determined at step S110 (step S120).

FIG. 5 illustrates the relationship between the required heat value and the exhaust heat of the fuel cell stack. The upper drawing of FIG. 5 shows the relationship between the required heat value and the exhaust heat of the fuel cell stack when the output-based required current value Iref is not smaller than the heat value-based required current value I0. The lower drawing of FIG. 5 shows the relationship between the required heat value and the exhaust heat of the fuel cell stack when the output-based required current value Iref is smaller than the heat value-based required current value I0. The abscissa and the ordinate of FIG. 5 are the same as the abscissa and the ordinate of FIG. 3. A curve Lq1 in both the upper drawing and the lower drawing of FIG. 5 is an equal heat generation curve with respect to the required heat value equal to a heat value Qfc1. A curve Lp1 in the upper drawing of FIG. 5 is an equal output curve with respect to a required output value Pfc1, and a curve Lp2 in the lower drawing of FIG. 5 is an equal output curve with respect to a required output curve Pfc2. A curve Lc in both the upper drawing and the lower drawing of FIG. 5 is an I-V characteristic curve of the fuel cell stack 10. A theoretical electromotive force Vth shown by a dashed line in both the upper drawing and the lower drawing of FIG. 5 represents a voltage computed by multiplying the maximum electromotive force per unit cell (for example, 1.23 V) by the number of cells included in the fuel cell stack 10.

For example, as shown in the upper drawing of FIG. 5, when the required output for the fuel cell stack 10 is equal to the output value Pfc1 shown by the curve Lp1, the operating point during ordinary operation of the fuel cell stack 10 is an operating point p11 as the intersection of the curve Lc with the curve Lp1. The current value and the voltage value at this operating point are respectively Iref(1) and Vref(1). An amount of exhaust heat Qp during operation of the fuel cell stack 10 at the operating point p11 is the amount of heat corresponding to an area surrounded by the solid lines in the upper drawing of FIG. 5 and is expressed by Equation 2 given below:

[Math. 2]

$$Qp = Iref(1) * (Vth - Vref(1)) \qquad (2)$$

When the required heat value for the fuel cell stack 10 is the amount of heat Qfc1 shown by the curve Lq1 during ordinary operation of the fuel cell stack 10 (having the operating point on the I-V characteristic curve), the operating point fulfilling the required heat value is an operating point p21 (I0(1), V0(1)) as the intersection of the curve Lc with the curve Lq1. In this state, a required heat value Qq is the amount of heat corresponding to an area surrounded by the broken lines in the upper drawing of FIG. 5 and is expressed by Equation 3 given below:

[Math. 3]

$$Qq = (I0(1)) * (Vth - V0(1)) \qquad (3)$$

As shown in the upper drawing of FIG. 5, when the current value of the operating point p11, i.e., the output-based required current value Iref(1) is equal to or greater than the heat value-based required current value I0(1), the amount of exhaust heat Qp is equal to or greater than the required heat value Qq. This is because of the I-V characteristic of the fuel cell stack 10 (i.e., shape of the curve Lc) that the voltage value decreases with an increase in current value. In this case, shifting the operating point of the fuel cell stack 10 along the I-V characteristic curve (curve Lc) to the operating point p11 as the target operating point enables the required heat value Qq to be sufficiently supplied by the exhaust heat of the fuel cell stack 10.

As shown in the lower drawing of FIG. 5, on the other hand, when the required heat value for the fuel cell stack 10 is equal to the required heat value Qq in the upper drawing of FIG. 5, when the heat value-based required current value is equal to the current value (I0(1)) and when the required output for the fuel cell stack 10 is equal to the output value Pfc2 shown by the curve Lp2, the operating point of the fuel cell stack 10 during ordinary operation is an operating point p21 (Iref(2), Vref(2)) as the intersection of the curve Lc with the curve Lp2. The amount of exhaust heat Qp during operation of the fuel cell stack 10 at the operating point p21 is the amount of heat corresponding to an area surrounded by the solid lines in the lower drawing of FIG. 5 and is expressed by Equation 4 given below:

[Math. 4]

$$Qp = Iref(2) * (Vth - Vref(2)) \quad (4)$$

As shown in the lower drawing of FIG. 5, when the current value of the operating point p21, i.e., the output-based required current value Iref(2) is smaller than the heat value-based required current value I0(1), the amount of exhaust heat Qp is smaller than the required heat value Qq. This is because of the I-V characteristic of the fuel cell stack 10. In this case, shifting the operating point of the fuel cell stack 10 along the I-V characteristic curve (curve Lc) to the operating point p11 does not enable the required heat value Qq to be satisfied by the exhaust heat of the fuel cell stack 10.

The fuel cell system 100 accordingly sets the heat value-based required current value I0 to the changeover current value Is and compares the output-based required current value Iref with the changeover current value Is (heat value-based required current value I0) at step S120. When the output-based required current value Iref is not smaller than the changeover current value Is (heat value-based required current value I0), the ordinary operation is performed to shift the operating point of the fuel cell stack 10 along the I-V characteristic curve as described below. When the output-based required current value Iref is smaller than the changeover current value Is (heat value-based required current value I0), on the other hand, the operation for heating described below is performed to satisfy the required heat value.

When it is determined that the output-based required current value Iref is not smaller than the changeover current value Is (step S120: NO), the heating controller 61d controls the operation controller 61a to perform ordinary operation control (step S125) and subsequently performs heating control (step S130). In the ordinary operation control, the operation controller 61a regulates the supply amounts of the reaction gases and the voltage of the fuel cell stack 10, in order to shift the operating point of the fuel cell stack 10 from the current operating point to the ordinary operating point determined at step S115. In the heating control, the heating controller 61d regulates the flow rate of the second coolant pump 49 and the rotation speed of the second power-driven fan 37 to control the amount of heat supplied to the heater core 36 via the coolant and thereby warm up the vehicle interior to a specified temperature.

After step S130, the heating controller 61d determines whether the heating request is off (step S135). When the heating request is not off, the processing flow returns to step S100. When the heating request is off, the heating control process is terminated. In a next or subsequent cycle of the heating control process of and after step S100, there is a possibility that the required heat value is changed with a change of the specified temperature from that in the previous cycle. There is also a possibility that the required output is changed, for example, with a change in accelerator depression from that in the previous cycle. In the next or subsequent cycle, there is accordingly a possibility that it is determined at step S120 that the output-based required current value Iref is smaller than the changeover current value Is.

When it is determined that the output-based required current value Iref is smaller than the changeover current value Is (step S120: YES), the heating controller 61d determines a target operating point during operation for heating described later (hereinafter referred to as "operation-for-heating target operating point") (step S145). More specifically, the operating point satisfying both the required heat value and the required output is defined as the operation-for-heating target operating point. The operation-for-heating target operating point corresponds to the required operating point in the claims.

Figure 6:
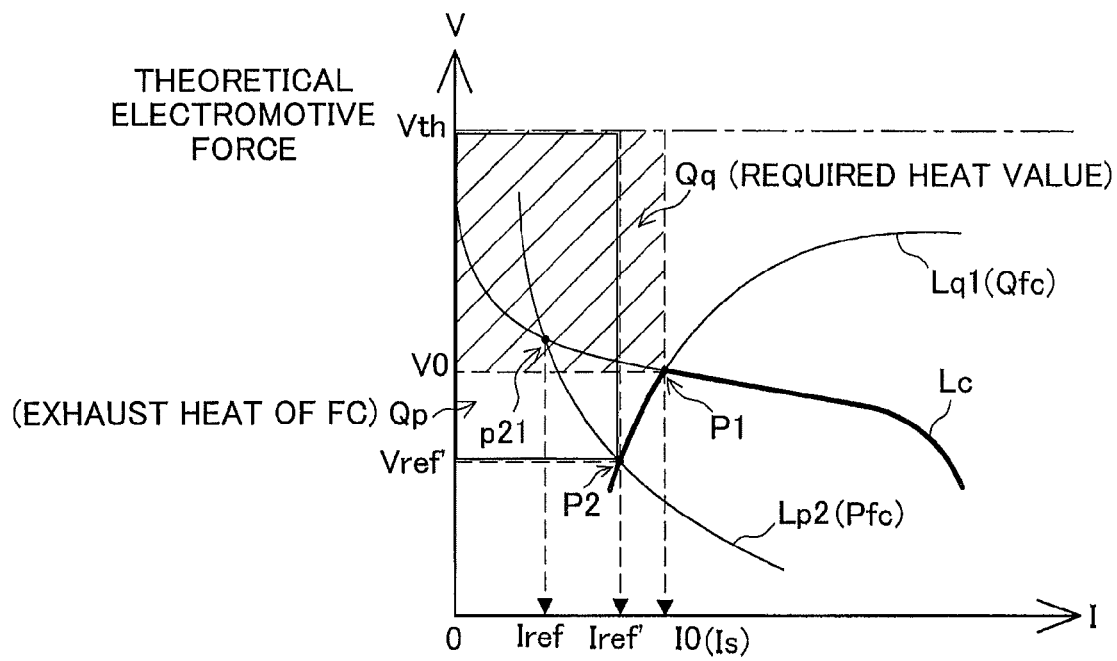
FIG. 6 illustrates the operation-for-heating target operating point determined at step S145.

FIG. 6 illustrates the operation-for-heating target operating point determined at step S145. The abscissa and the ordinate of FIG. 6 are the same as the abscissa and the ordinate of FIG. 5. Curves Lc, Lp2 and Lq1 of FIG. 6 are identical with the curves Lc, Lp2 and Lq1 shown in the lower drawing of FIG. 5. When the required output Pfc for the fuel cell stack 10 is the output value shown by the curve Lp2 and when the required heat value Qfc is the amount of heat shown by the curve Lq1, the operation controller 61a determines an operating point P2 (Iref', Vref'), which is the intersection of the two curves Lp2 and Lq1, as the operation-for-heating target operating point. More specifically, the operation controller 61a determines a current value Iref' according to Equation 5 given below and subsequently determines a voltage value Vref' according to Equation 6 given below using the determined current value Iref':

[Math. 5]

$$Iref' = (Qfc + Pfc)/Vth \quad (5)$$

[Math. 6]

$$Vref' = Pfc/Iref' \quad (6)$$

After determining the operation-for-heating target operating point at step S145, the heating controller 61d controls the operation controller 61a to perform operation-for-heating control (step S150) and subsequently performs heating control (step S155). The processing of step S155 is identical with the processing of step S130.

Figure 7:
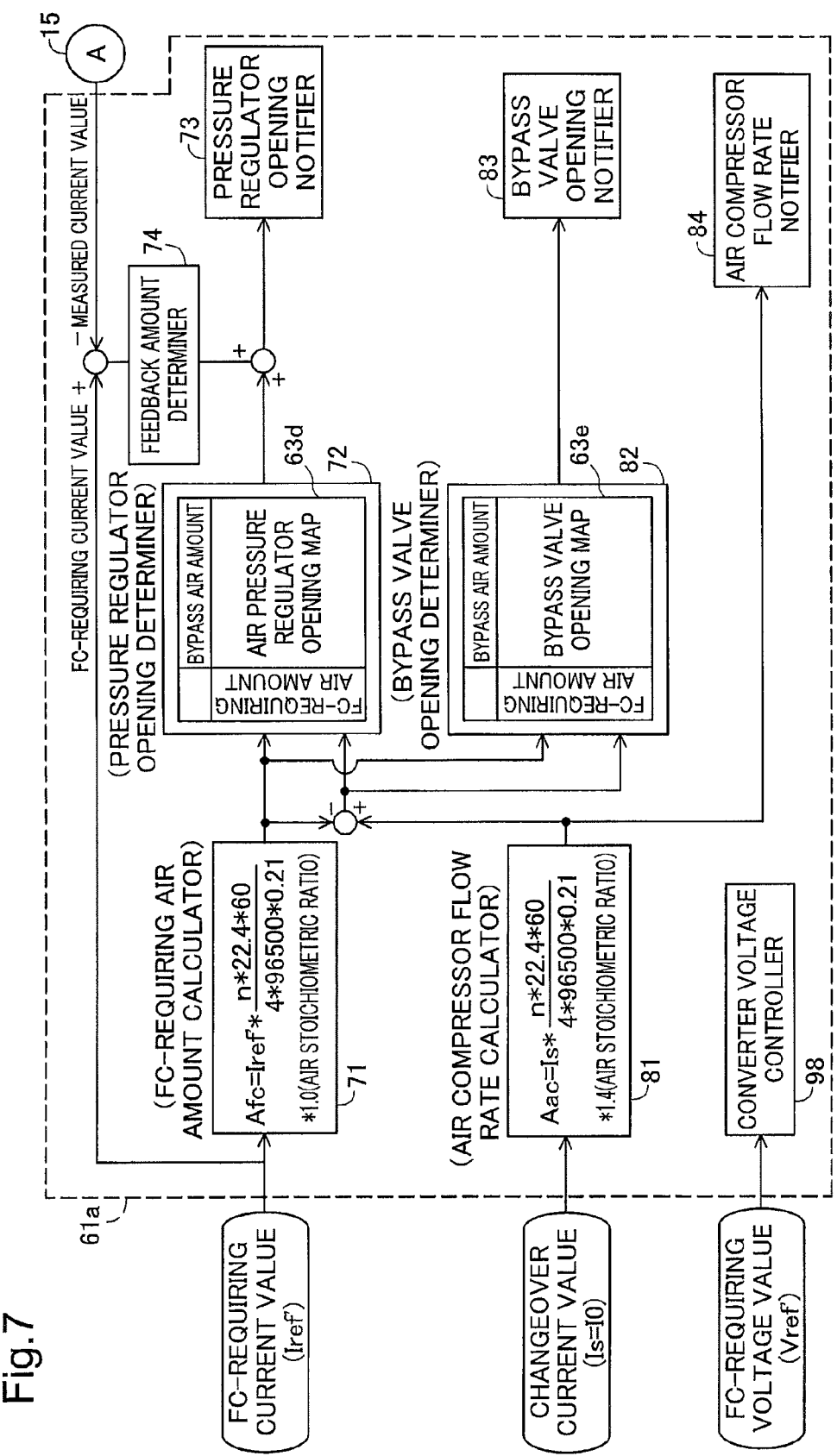
FIG. 7 schematically illustrates the functional blocks of the operation controller and the processing details of warm-up-operation-for-heating control.

FIG. 7 schematically illustrates the functional blocks of the operation controller and the processing details of warm-up-operation-for-heating control. As illustrated in FIG. 7, the operation controller 61a includes an FC-requiring air amount calculator 71, an air compressor flow rate calculator 81, a converter voltage controller 98, a pressure regulator opening determiner 72, a bypass valve opening determiner 82, a feedback amount determiner 74, a pressure regulator opening notifier 73, a bypass valve opening notifier 83 and an air compressor flow rate notifier 84.

The FC-requiring air amount calculator 71 is a functional block to calculate the amount of the air required by the fuel cell stack 10 during operation-for-heating (FC-requiring air amount Afc). The air compressor flow rate calculator 81 is a functional block to calculate the supply air amount Aac. The converter voltage controller 98 is a functional block to control the DC-DC converter and thereby regulate the voltage of the fuel cell stack 10. The pressure regulator opening determiner 72 is a functional block to determine the opening of the pressure regulator 45 based on the pressure regulator opening map 63d. The bypass valve opening determiner 82 is a functional block to determine the opening of the bypass valve 44 based on the bypass valve opening map 63e.

The feedback amount determiner 74 is a functional block to determine a correction amount (feedback amount) for the opening of the pressure regulator 45 determined by the pressure regulator opening determiner 72, based on the difference between the FC-requiring current value (i.e., the current value Iref of the operation-for-heating target operating point) and the measured current value notified by the ammeter 15. The pressure regulator opening notifier 73 is a functional block to determine a target opening of the pressure regulator 45 by summing up the opening of the pressure regulator 45 determined by the pressure regulator opening determiner 72 and the feedback amount determined by the feedback amount determiner 74 and to notify the valve controller 61c of the determined target opening. The bypass valve opening notifier 83 is a functional block to notify the valve controller 61c of the opening of the bypass valve 44 determined by the bypass valve opening determiner 82. The air compressor flow rate notifier 84 is a functional block to notify the air compressor controller 61b of the supply air amount Aac calculated by the air compressor flow rate calculator 81.

The FC-requiring air amount calculator 71 calculates the FC-requiring air amount Afc according to Equation 7 given below using the current value Iref of the operation-for-heating target operating point determined at step S145. In Equation 7, a constant "n" represents the number of unit cells included in the fuel cell stack 10; a constant "22.4" is a factor to convert the amount of the air (moles) to the volume (liters); a constant "60" is a factor to convert the minute to the seconds; a constant "96500" is a Faraday constant; and a constant "0.21" is the oxygen content rate in the air. As shown in Equation 7, a constant "1.0" is used as the air stoichiometric ratio for calculation of the FC-requiring air amount Afc:

[Math. 7]

$$Afc = Iref * \frac{n*22.4*60}{4*96500*0.21} * (\text{Air stoichiometric ratio of } 1.0) \quad (7)$$

The air compressor flow rate calculator 81 calculates the supply air amount Aac according to Equation 8 given below using the changeover current value Is (heat value-based required current value I0) determined at step S110. The values of the respective constants used in Equation 8 are identical with those of the corresponding constants in Equation 7, except the air stoichiometric ratio. The air stoichiometric ratio used for calculation of the supply air amount Aac is a predetermined value as the air stoichiometric ratio during ordinary operation. In Equation 8, a value "1.4" is used as the air stoichiometric ratio during ordinary operation. Any other value may, however, be used as the air stoichiometric ratio.

[Math. 8]

$$Aac = Is * \frac{n*22.4*60}{4*96500*0.21} * (\text{Air stoichiometric ratio of } 1.4) \quad (8)$$

The air compressor flow rate notifier 84 controls the air compressor 32 via the air compressor controller 61b to supply the supply air amount Aac calculated as described above. As shown in Equation 8 given above, the current value used for calculating the supply air amount Aac is the changeover current value Is, i.e., the heat value-based required current value I0. The air compressor 32 accordingly supplies the air on the assumption that the target operating point of the fuel cell stack 10 is not the operation-for-heating target operating point (operating point P2 in FIG. 6) but is the intersection of the I-V characteristic curve (curve Lc) with the equal heat generation curve with respect to the required heat value Qfc (curve Lq1) (operating point P1 (I0,V0) in FIG. 6). In this case, the heat value-based required current value I0 is greater than the current value Iref of the operation-for-heating target operating point, so that the supply air amount Aac is greater than the FC-requiring air amount Afc.

The pressure regulator opening determiner 72 calculates the bypass air amount Abp by subtracting the FC-requiring air amount Afc calculated by the FC-requiring air amount calculator 71 from the supply air amount Aac calculated by the air compressor flow rate calculator 81, refers to the pressure regulator opening map 63d to determine the opening of the pressure regulator 45 based on the calculated bypass air amount Abp and the calculated FC-requiring air amount Afc, and notifies the pressure regulator opening notifier 73 of the determined opening. The pressure regulator opening notifier 73 determines the opening of the pressure regulator 45 based on the opening notified by the pressure regulator opening determiner 72 and the opening correction value notified by the feedback amount determiner 74, and notifies the valve controller 61c shown in FIG. 1 of the determined opening. In the initial stage, there is no opening correction value notified by the feedback amount determiner 74, so that the opening of the pressure regulator 45 is regulated to the opening determined by the pressure regulator opening determiner 72.

The feedback amount determiner 74 performs comparison between the measured current value by the ammeter 15 and the FC-requiring current value (current value Iref) and determination of the opening correction value of the pressure regulator 45 at regular intervals and notifies the pressure regulator opening notifier 73 of the determined opening correction value. More specifically, a table (not shown) stored in the ROM 63 stores the settings of the correction value correlated to the current value difference between the measured current value and the current value Iref. The feedback amount determiner 74 refers to this table to determine the correction value and notifies the pressure regulator opening notifier 73 of the determined correction value. In the table storing the settings of the correction value correlated to the current value difference between the measured current value and the current value Iref, when the measured current value is smaller than the current value Iref, the correction value is set to increase the opening of the pressure regulator 45 and is set to increase the opening with an increase in current value difference. When the measured current value is greater than the current value Iref, the correction value is set to decrease the opening of the pressure regulator 45 and is set to decrease the opening with an increase in current value difference. The opening of the pressure regulator 45 is regulated, based on the correction value set in this manner, so that the operating point of the fuel cell stack 10 is controlled to the operation-for-heating target operating point (operating point P2 (Iref',Vref') shown in FIG. 6).

The FC-requiring air amount Afc is not set to a theoretical amount of the air for satisfying the current value Iref of the operation-for-heating target operating point (theoretical amount of the air at the air stoichiometric ratio of 1.4) but is set to the amount of the air at the air stoichiometric ratio of 1.0 (the amount of the air less than the theoretical amount of the air), and is subsequently adjusted by feedback control, because of the following reason. The predetermined air stoichiometric ratio ("1.4" in this embodiment) is a specified value to supply the amount of the air required for each unit cell during ordinary operation where the operating point of the fuel cell stack 10 is located on the I-V characteristic curve. In the state where the operating point is not located on the I-V characteristic curve but causes concentration overvoltage as in the operation-for-heating, using the air stoichiometric ratio set on the premise of ordinary operation may fail to supply an adequate amount of the air as the FC-requiring air amount Afc (may supply an excessive amount of the air). The FC-requiring air amount Afc is thus initially set to a relatively small value with setting the air stoichiometric ratio to 1.0. The pressure regulator 45 is then regulated to make the measured current value approach to the current value Iref of the target operating point, so as to supply an adequate amount of the air as the FC-requiring air amount Afc.

The bypass valve opening determiner 82 calculates the bypass air amount Abp by subtracting the FC-requiring air amount Afc calculated by the FC-requiring air amount calculator 71 from the supply air amount Aac calculated by the air compressor flow rate calculator 81, refers to the bypass valve opening map 63e to determine the opening of the bypass valve 44 based on the calculated bypass air amount Abp and the calculated FC-requiring air amount Afc and notifies the bypass valve opening notifier 83 of the determined opening. The bypass valve opening notifier 83 determines the opening of the bypass valve 44 based on the opening notified by the bypass valve opening determiner 82 and notifies the valve controller 61c shown in FIG. 1 of the determined opening. The opening of the bypass valve 44 is accordingly regulated to the opening determined by the bypass valve opening determiner 82.

The converter voltage controller 98 notifies the DC-DC converter 210 of the voltage value Vref of the operation-for-heating target operating point determined at step S145. The DC-DC converter 210 then regulates the voltage of the fuel cell stack 10 to satisfy the voltage value Vref.

Referring back to FIG. 4, after performing the heating control (step S155), the heating controller 61d determines whether the heating request is off (step S160). When the heating request is not off, the processing flow returns to step S100. When the heating request is off, the heating control process is terminated.

Figure 8:
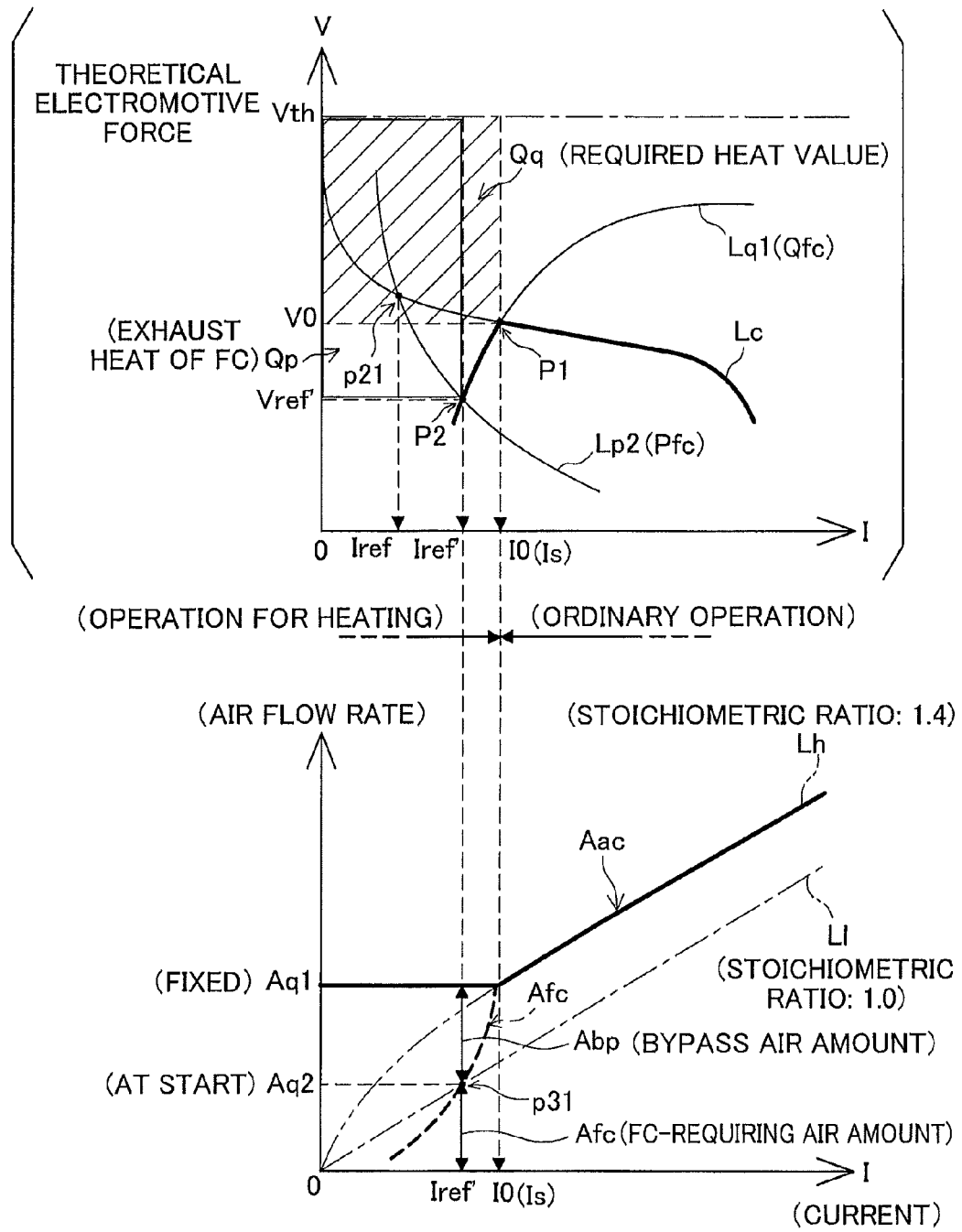
FIG. 8 illustrates the relationships of the supply air amount, the FC-requiring air amount and the bypass air amount to the current value during heating control process.

FIG. 8 illustrates the relationships of the supply air amount, the FC-requiring air amount and the bypass air amount to the current value during heating control process. The lower drawing of FIG. 8 shows the relationships of the supply air amount Aac, the FC-requiring air amount Afc and the bypass air amount Abp to the current value during heating control process. For convenience of explanation, the upper drawing of FIG. 8 is duplication of FIG. 6.

The lower drawing of FIG. 8 shows the current value of the fuel cell stack 10 as abscissa and the air flow rate as ordinate. In the lower drawing of FIG. 8, a thick solid-line curve shows the supply air amount Aac by the air compressor 32, and a thick broken-line curve shows the FC-requiring air amount Afc. When the current value is equal to or greater than the heat value-based required current value I0 (changeover current value Is), the FC-requiring air amount Afc is equal to the supply air amount Aac. In the lower drawing of FIG. 8, a dashed-line curve L1 shows the relationship between the current value of the fuel cell stack 10 and the FC-requiring air amount Afc at the air stoichiometric ratio of 1.0 during ordinary operation. In the lower drawing of FIG. 8, a double dashed-line curve Lh shows the relationship between the current value of the fuel cell stack 10 and the FC-requiring air amount Afc at the air stoichiometric ratio of 1.4 during ordinary operation.

As shown in the lower drawing of FIG. 8, when the current value of the fuel cell stack 10 is smaller than the heat value-based required current value I0 (changeover current value Is), i.e., during operation for heating, the supply air amount Aac is fixed to an amount of the air Aq1, irrespective of the magnitude of the current value of the fuel cell stack 10. This is because of the following reason. In the state that the supply air amount Aac is fixed to the amount of the air Aq1, there is no need to change the supply air amount Aac at the target operating point of not greater than the heat value-based required current value I0 (changeover current value Is). As a result, the responsiveness of the air compressor 32 has only the limited influence when there is a need to change the FC-requiring air amount Afc with a change in target operating point. This improves the output responsiveness and the thermogenic responsiveness of the fuel cell stack 10 even when the air compressor 32 has low responsiveness. For example, even when there is an increase in accelerator depression during operation for heating, this allows an increase in FC-requiring air amount with keeping the rotation speed of the air compressor 32 unchanged, thus improving the output responsiveness.

The supply air amount Aac is fixed to the amount of the air Aq1 at the operating point on the I-V characteristic curve having the current value equal to the heat value-based required current value I0, because of the following reason. Fixing the supply air amount Aac to the amount of the air to satisfy the higher current value than the heat value-based required current value I0 extends the current value range for the operation for heating. This increases the opportunity of performing the operation-for-heating control that is more complicated control than the ordinary operation control. This may result in decreasing the output responsiveness and the thermogenic responsiveness. When the supply air amount Aac is fixed to the amount of the air corresponding to the rotation speed to satisfy the lower current value than the heat value-based required current value I0, on the other hand, there is a greater amount of increase in rotation speed of the air compressor 32 in the shift of the operation from the operation for heating to the ordinary operation with an increase in required output. In this case, the low responsiveness of the air compressor 32 leads to the low responsiveness to regulation of the amount of the air. This may result in decreasing the output responsiveness and the thermogenic responsiveness. Fixing the supply air amount Aac to the amount of the air Aq1 at the operating point on the I-V characteristic curve having the current value equal to the heat value-based required current value I0 simultaneously satisfies the requirement of narrowing the current value range for the operation for heating and the requirement of limiting the amount of increase in rotation speed of the air compressor 32 (i.e., the amount of increase in supply air amount Aac) in the shift of the operation from the operation for heating to the ordinary operation.

As shown in the lower drawing of FIG. 8, at the time when the operation for heating starts, the FC-requiring air amount Afc is equal to an amount of the air Aq2 at a point P31 on the line L1, while the bypass air amount Apb is equal to the difference amount of the air between the amount of the air Aq1 and the amount of the air Aq2. With an increase in current value of the target operating point during operation for heating, the FC-requiring air amount Afc gradually increases with deviating from the line L1 at the stoichiometric ratio of 1.0. When the target current value is not smaller than the changeover current value Is (heat value-based required current value I0), the FC-requiring air amount Afc becomes equal to the supply air amount Aac.

During operation for heating, at the concentration overvoltage, pumping hydrogen is produced at the cathode of each unit cell. During warm-up operation at the start, there is a high required heat value (for example, 90 kW), which results in producing a large amount of pumping hydrogen. The bypass air amount Abp is thus to be determined by taking into account the amount of the air used to dilute the pumping hydrogen. There is, on the other hand, a low required heat value by a heating request (for example, 5 kW), which results in producing a small amount of pumping hydrogen. The pumping hydrogen can thus be sufficiently diluted with the difference amount of the air by subtracting the FC-requiring air amount Afc from the supply air amount Aac (i.e., bypass air amount). The fuel cell system 100 accordingly does not need to calculate the amount of the air required for diluting the pumping hydrogen during operation for heating. This simplifies the heating control and improves the responsiveness to regulation of the amount of the air.

As shown in the upper drawing of FIG. 8, at the time when the operation for heating starts, the operating point of the fuel cell stack 10 is the operating point P2. When there is a subsequent increase in required output with keeping the required heat value unchanged, the operating point shifts along the equal heat generation curve with respect to the required heat value Qfc (curve Lq1). When the target current value Iref exceeds the changeover current value Is (heat value-based required current value I0), the ordinary operation is performed to shift the operating point of the fuel cell stack 10 along the I-V characteristic curve (curve Lc).

As described above, the fuel cell system 100 of the first embodiment determines whether the output-based required current value Iref is smaller than the heat value-based required current value I0. When the output-based required current value Iref is not smaller than the heat value-based required current value I0, the ordinary operation is performed. This improves the output responsiveness and the thermogenic responsiveness without requiring complicated heating control. Additionally, when the output-based required current value Iref is not smaller than the heat value-based required current value I0, the required output is fulfilled. This improves the output responsiveness. When the output-based required current value Iref is not smaller than the heat value-based required current value I0, the amount of exhaust heat of the fuel cell stack 10 during ordinary operation becomes greater than the required heat value. This enables the required heat value to be satisfied by the amount of exhaust heat of the fuel cell stack 10, thus improving the thermogenic responsiveness.

When the output-based required current value Iref is smaller than the heat value-based required current value I0, on the other hand, the operation for heating is performed to control the operating point to the operating point with the lower power generation efficiency (i.e., with the higher heat generation efficiency) than that in the ordinary operation. This enables the required heat value to be satisfied by the amount of exhaust heat of the fuel cell stack 10. Additionally, the amount of the air and the voltage are regulated by setting the operating point that satisfies both the required heat value and the required output as the target operating point. This improves the thermogenic responsiveness and the output responsiveness. During operation for heating, the rotation speed of the air compressor 32 is fixed. This limits the influence of the responsiveness of the air compressor 32. Even when the air compressor has low responsiveness, such fixation improves the output responsiveness and the thermogenic responsiveness.

During operation for heating, the supply air amount Aac is fixed to the amount of the air at the operating point on the I-V characteristic curve having the current value equal to the heat value-based required current value I0. This simultaneously satisfies the requirement of narrowing the current value range for the operation for heating and the requirement of limiting the amount of increase in rotation speed of the air compressor 32 in the shift of the operation from the operation for heating to the ordinary operation. This simplifies the heating control and improves the responsiveness to regulation of the amount of the air, thus improving the output responsiveness and the thermogenic responsiveness of the fuel cell stack 10.

During operation for heating performed when the output-based required current value Iref is smaller than the heat value-based required current value I0, the operating point that satisfies both the required output and the required heat value is set as the operation-for-heating target operating point. This improves the output responsiveness and the thermogenic responsiveness.

The above configuration does not require the operation of calculating the amount of the air used to dilute the pumping hydrogen produced during operation for heating. This improves the responsiveness to regulation of the amount of the air, compared with the configuration performing this operation.

The FC-requiring air amount Afc is not initially set to the theoretical amount of the air to satisfy the current value Iref of the operation-for-heating target operating point but is set to the smaller amount of the air than the theoretical amount of the air. The amount of the air is then regulated by feedback control. This enables an adequate amount of the air to be supplied as the FC-requiring air amount Afc even in the state that the operating point is not located on the I-V characteristic curve but causes concentration overvoltage.

B. Second Embodiment

A fuel cell system according to a second embodiment differs from the fuel cell system 100 according to the first embodiment by the control procedure that does not immediately start the heating control process in response to a heating request during start-time warm-up operation (described later), but continues the start-time warm-up operation until the vehicle interior temperature reaches a specified temperature and starts the heating control process when the vehicle interior temperature reaches or exceeds the specified temperature. The other configuration of the second embodiment is similar to that of the first embodiment.

In the fuel cell system of the second embodiment, at a sub-zero start, warm-up operation is performed to increase the operating temperature of the fuel cell to a specific temperature range that allows efficient power generation (for example, 60° C. to 80° C.). During such warm-up operation (hereinafter referred to as "start-time warm-up operation"), an operating point of the lower power generation efficiency than that during operation for heating of the first embodiment is set as a target operating point, in order to increase the heat value (i.e., in order to increase the concentration overvoltage). This start-time warm-up operation differs from the operation for heating of the first embodiment by the following points but is otherwise similar to the operation for heating: the lower power generation efficiency results in the lower fuel efficiency; the output of the fuel cell stack 10 may be lower than the required output; regulating the rotation speed of the air compressor 32 significantly varies the amount of the air supplied to the fuel cell stack 10; and no feedback control is performed. The known warm-up operation performed at the start of the fuel cell stack 10 may be employed as the start-time warm-up operation.

Figure 9:
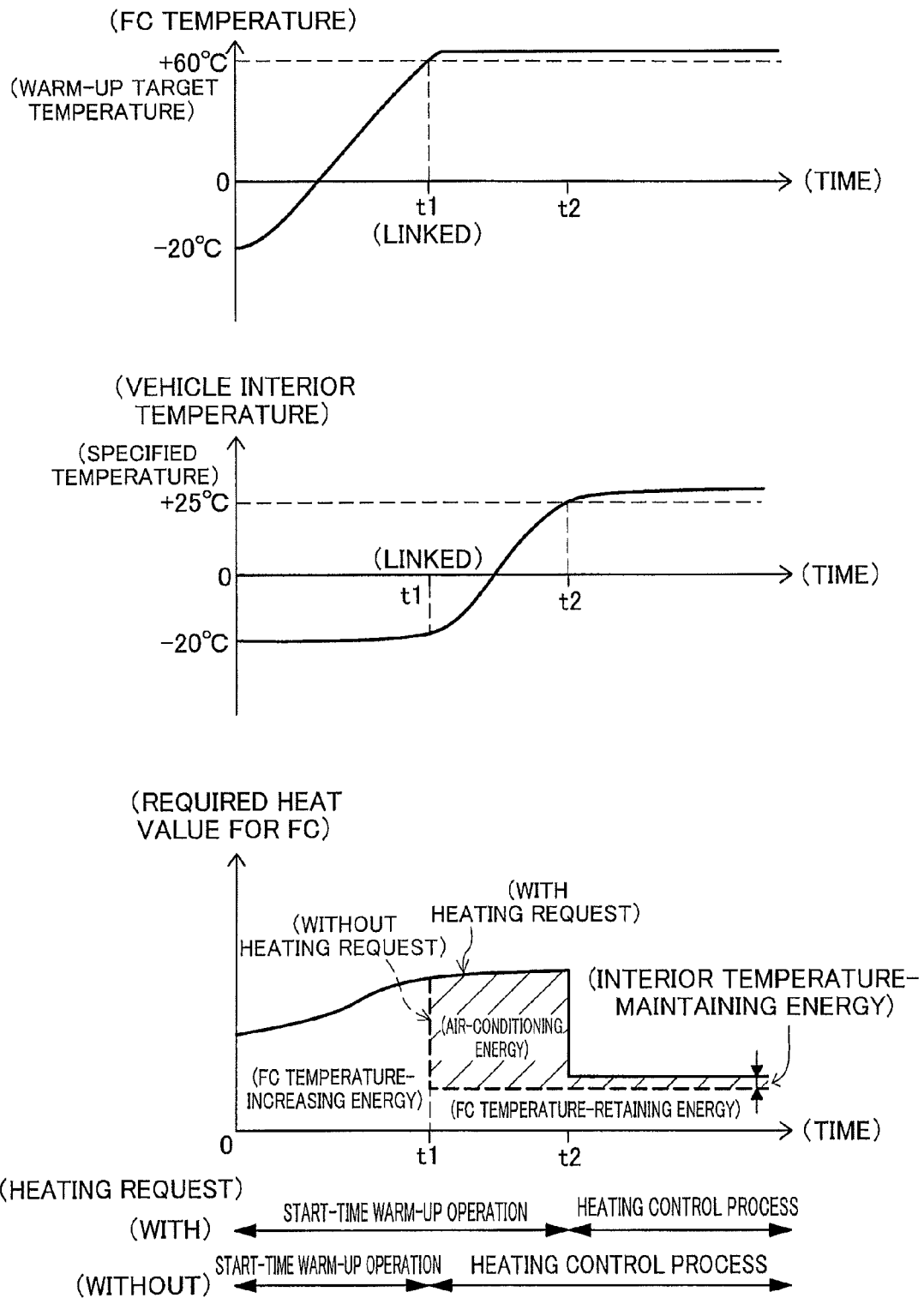
FIG. 9 schematically illustrates examples of variations in temperature of the fuel cell stack, vehicle interior temperature and amount of exhaust heat at the start of the fuel cell system according to the second embodiment.

FIG. 9 schematically illustrates examples of variations in temperature of the fuel cell stack, vehicle interior temperature and amount of exhaust heat at the start of the fuel cell system according to the second embodiment. The upper drawing of FIG. 9 shows an example of variation in temperature of the fuel cell stack 10 at the start. The middle drawing of FIG. 9 shows an example of variation in vehicle interior temperature in response to a heating request during the start-time warm-up operation. In the lower drawing of FIG. 9, a solid-line curve shows an example of variation in required heat value for the fuel cell stack 10 with a heating request during the start-time warm-up operation, and a broken-line curve shows a variation in required heat value for the fuel cell stack 10 without a heating request. In the respective drawings of FIG. 9, the abscissa shows the time. The ordinate in the upper drawing of FIG. 9 shows the temperature of the fuel cell stack 10; the ordinate in the middle drawing of FIG. 9 shows the vehicle interior temperature; and the ordinate in the lower drawing of FIG. 9 shows the required heat value for the fuel cell stack 10.

In the fuel cell system of the second embodiment, a warm-up target temperature is set to +60° C. As shown in the upper drawing of FIG. 9, the temperature of the fuel cell stack 10 rises from −20° C. at the start and reaches the warm-up target temperature (+60° C.) at a time t1. In the fuel cell system of the second embodiment, the completion timing of the start-time warm-up operation without a heating request is the time t1 when the temperature of the fuel cell stack 10 reaches the warm-up target temperature as shown by the broken-line curve in the lower drawing of FIG. 9. As shown in the lower drawing of FIG. 9 without a heating request, the fuel cell system performs the heating control process to obtain the energy required to keep the fuel cell stack 10 at the adequate temperature (temperature-retaining energy) after the time t1.

With a heating request during the start-time warm-up operation, on the other hand, the first coolant circulation path R1 and the second coolant circulation path R2 are linked with each other at the time t1 to utilize the exhaust heat of the fuel cell stack 10 for heating. In this state, the start-time warm-up operation is not terminated, unlike the state without a heating request. As shown in the middle drawing of FIG. 9, the vehicle interior temperature abruptly increases after the time t1 from −20° C. at the start and reaches +25° C. that is the specified temperature by the heating request, at a time t2.

The fuel cell system of the second embodiment monitors the vehicle interior temperature, and terminates the start-time warm-up operation and starts the heating control process when the vehicle interior temperature reaches the specified temperature. As shown in the lower drawing of FIG. 9, the exhaust heat of the fuel cell stack 10 generated during the start-time warm-up operation from the time t1 to the time t2 is used for the air-conditioning energy for heating and the temperature-retaining energy of the fuel cell stack 10. After the time t2, the exhaust heat of the fuel cell stack 10 generated during the heating control process is used for the air-conditioning energy for heating (interior temperature-maintaining energy) and the temperature-retaining energy of the fuel cell stack 10.

The control procedure continues the start-time warm-up operation until the vehicle interior temperature reaches the specified temperature and starts the operation for heating when the vehicle interior temperature reaches the specified temperature, because of the following reason. The start-time warm-up operation has a higher heat value than the operation for heating. Continuing the start-time warm-up operation until the vehicle interior temperature reaches the specified temperature thus enables the vehicle interior temperature to rise to the specified temperature within a shorter period of time. After the vehicle interior temperature reaches the specified temperature, since the amount of heat required for maintaining the vehicle interior temperature and the amount of heat required for keeping the temperature of the fuel cell stack 10 are relatively small, the operation for heating is performed to improve the output responsiveness and the thermogenic responsiveness of the fuel cell stack 10.

The fuel cell system of the second embodiment described above has the similar advantageous effects to those of the fuel cell system 100 of the first embodiment. Additionally, continuing the start-time warm-up operation until the vehicle interior temperature reaches the specified temperature enables the vehicle interior temperature to rise to the specified temperature within a shorter period of time. After the vehicle interior temperature reaches the specified temperature, the operation for heating is performed to improve the output responsiveness and the thermogenic responsiveness.

C. Third Embodiment

Figure 10:
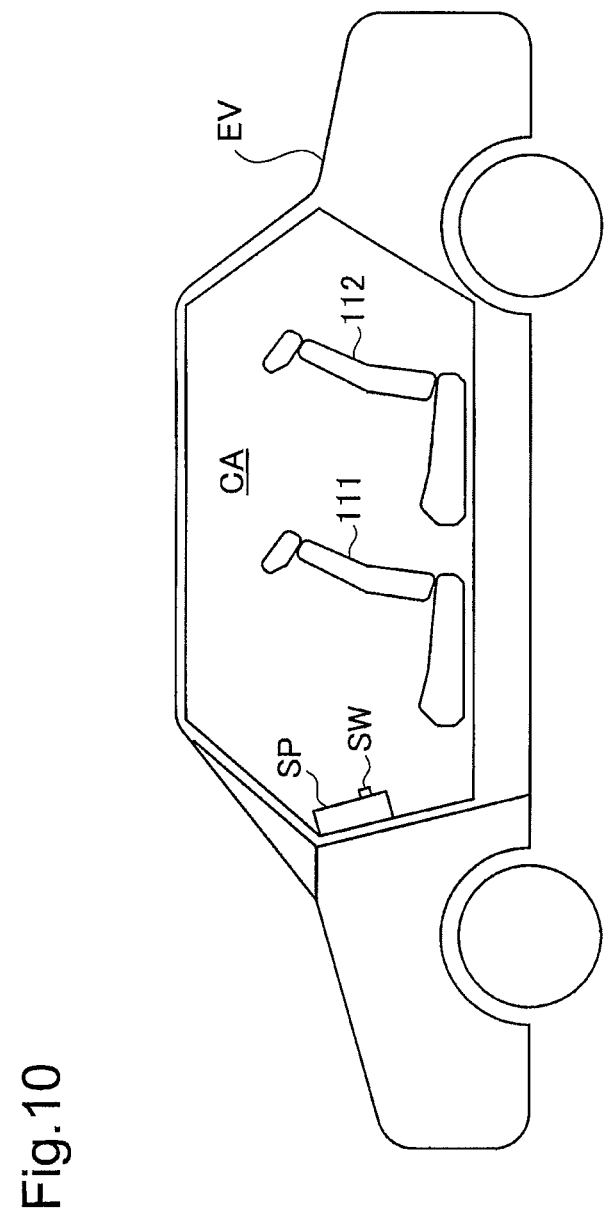
FIG. 10 schematically illustrates the appearance of an electric vehicle equipped with a fuel cell system according to a third embodiment.

FIG. 10 schematically illustrates the appearance of an electric vehicle equipped with a fuel cell system according to a third embodiment. The electric vehicle EV of the third embodiment includes a vehicle interior CA, front seats 111, rear seats 112 and an operation panel SP. The front seats 111 and the rear seats 112 are located inside the vehicle interior CA. The operation panel SP is located in front of the driver's seat and includes a maximum heat-up switch SW.

The fuel cell system of the third embodiment differs from the fuel cell system of the second embodiment by the following points but otherwise has the similar configuration to that of the fuel cell system of the second embodiment: the fuel cell system of the third embodiment has two different operation-for-heating modes during the start-time warm-up operation: a mode that terminates the start-time warm-up operation and starts the heating control process at the timing when the vehicle interior temperature reaches the specified temperature as described in the second embodiment (hereinafter referred to as "maximum heat-up mode") and a mode that terminates the start-time warm-up operation and starts the heating control process at the timing when the temperature of the fuel cell stack 10 reaches a specific high-efficient operating temperature (for example, +60° C.) (hereinafter referred to as "fuel efficiency priority mode"), and has the maximum heat-up switch SW. The maximum heat-up switch SW corresponds to the user interface in the claims. The maximum heat-up mode and the fuel efficiency priority mode respectively correspond to the first operation-for-heating mode and the second operation-for-heating mode in the claims.

The maximum heat-up switch SW is operated to set the maximum heat-up mode as the operation-for-heating mode during the start-time warm-up operation. The driver (passenger) presses this maximum heat-up switch SW as the heating request during the start-time warm-up operation to set the maximum heat-up mode and thereby heats up the vehicle interior within a shorter period of time. As described in the second embodiment, in the maximum heat-up mode to maximize the heat value of the fuel cell stack 10, however, the fuel efficiency and the output responsiveness are lowered. The driver (passenger) accordingly does not press the maximum heat-up switch SW when the lowered fuel efficiency and output responsiveness is undesirable. In this case, the fuel efficiency priority mode is set to perform the heating control process described in the first embodiment after the temperature of the fuel cell stack 10 reaches the warm-up target temperature.

The fuel cell system of the third embodiment described above has the similar advantageous effects to those of the fuel cell system of the second embodiment. Additionally, in the fuel cell system of the third embodiment, the maximum heat-up mode and the fuel efficiency priority mode are provided as the operation-for-heating modes during the start-time warm-up operation. The electric vehicle EV has the maximum heat-up switch SW to set the maximum heat-up mode. The driver (passenger) presses the maximum heat-up switch SW as the heating request to enable the vehicle interior to be warmed up within a shorter period of time at the start. The driver (passenger) does not press the maximum heat-up switch SW, on the other hand, in order to prevent the fuel efficiency and the output responsiveness from being lowered at the start.

D. Modifications

Among the various elements of the above respective embodiments, those other than the elements disclosed in independent claims are additional and supplementary elements and may be omitted as needed basis. The invention is not limited to the above embodiments but various modifications and variations may be made to the embodiments without departing from the scope of the invention. Some examples of possible modifications are given below.

D1. Modification 1

According to the third embodiment, a depression of the maximum heat-up switch SW is needed to set the maximum heat-up mode as the operation-for-heating mode during the start-time warm-up operation. The present invention is, however, not limited to this configuration. According to one modification, the operation-for-heating mode may be set to the maximum heat-up mode when a specifiable maximum temperature is specified as the temperature of the heating request and set to the fuel efficiency priority mode when a temperature other than the specifiable maximum temperature is specified as the temperature of the heating request. This modified configuration does not need the maximum heat-up switch SW and thereby saves the manufacturing cost of the electric vehicle EV.

According to another modification, the vehicle interior temperature may be measured in response to the driver's (passenger's) heating request, and the operation-for-heating mode may be set to the maximum heat-up mode when the vehicle interior temperature is lower than a predetermined temperature (for example, −10° C.) and set to the fuel efficiency priority mode when the vehicle interior temperature is not lower than the predetermined temperature. When the vehicle interior has extremely low temperature, there is a high demand for heating up the vehicle interior as soon as possible. This modified configuration sets the operation-for-heating mode to the maximum heat-up mode without requiring the driver's (passenger's) switch operation, thus enhancing the convenience of the driver (passenger).

D2. Modification 2

In the above embodiment, the FC-requiring air amount Afc during operation for heating is initially set to the flow rate calculated on the assumption of the air stoichiometric ratio of 1.0 and is then regulated according to the current value Iref of the operation-for-heating target operating point and the measured current value. The present invention is, however, not limited to this configuration. According to one modification, an optimum air stoichiometric ratio when the current value becomes equal to the current value Iref during operation for heating may be experimentally or otherwise determined in advance and stored in the ROM 63. The FC-requiring air amount Afc may be calculated using this air stoichiometric ratio. In this modified configuration, the opening of the pressure regulator 45 is determined and is fixed, based on the calculated FC-requiring air amount Afc. This simplifies the operation for regulating the amount of the air without feedback control, thus improving the responsiveness to regulation of the amount of the air.

D3. Modification 3

According to the second and the third embodiments, the start-time warm-up operation is terminated without a heating request when the temperature of the fuel cell stack 10 reaches +60° C. (i.e., when the exhaust heat of the fuel cell stack 10 reaches 90 kW). The condition of termination is, however, not limited to +60° C. but may be any temperature (any heat value). According to the second and the third embodiments, the temperature that causes thermal linkage of the first coolant circulation path R1 with the second coolant circulation path R2 is equal to the temperature that terminates the start-time warm-up operation without a heating request. The temperature for thermal linkage may be lower than or higher than this start-time warm-up operation terminating temperature.

According to the second and the third embodiments, the timing when the start-time warm-up operation is terminated is the same as the timing when the electric vehicle is made drivable. The timing when the electric vehicle is made drivable may be prior to the timing when the start-time warm-up operation is terminated. For example, the electric vehicle may be made drivable at the timing when the temperature of the fuel cell stack 10 reaches a temperature of ensuring the minimum necessary output for moving the electric vehicle (for example, +30° C.), while the start-time warm-up operation may be terminated at the timing when the temperature of the fuel cell stack 10 reaches a higher temperature (for example, +60° C.). This modified configuration enables the electric vehicle to be ready for driving at the earlier timing.

D4. Modification 4

According to the respective embodiments, the bypass valve 44 and the pressure regulator 45 are used to regulate the air flow ratio of the FC-requiring air amount Afc to the bypass air amount Abp. Only one of these elements may be used for such regulation. In this modified configuration, one valve used to regulate the flow rate ratio corresponds to the flow control valve in the claims. In general, a flow control valve operative to regulate the flow rate ratio of the flow rate of the oxidizing gas flowing through the oxidizing gas supply line to the fuel cell to the flow rate of the oxidizing gas flowing through the oxidizing gas supply line to the bypass line out of the oxidizing gas supplied from the oxidizing gas supplier may be employed for the fuel cell system of the invention.

D5. Modification 5

According to the respective embodiments, the heating control process performs the operation-for-heating control when the output-based required current value Iref is smaller than the changeover current value Is. One modification of the heating control process may perform start-time warm-up operation control, instead of the operation-for-heating control. The control procedure of this modification performs the ordinary operation when the output-based required current value Iref is not smaller than the changeover current value Is. This simplifies the control and improves the output responsiveness and the thermogenic responsiveness of the fuel cell stack 10, compared with the control procedure of performing the start-time warm-up operation control irrespective of the magnitude of the output-based required current value Iref. In general, an operation controller that controls the operating point of the fuel cell to the operating point of the lower power generation efficiency than that of the operating point on the current-voltage characteristic curve, when the output-based required current value is smaller than the heat value-based required current value (changeover current value) may be employed for the fuel cell system of the invention.

D6. Modification 6

The fuel cell system is mounted on the electric vehicle according to the respective embodiments. The fuel cell system is, however, applicable to various moving bodies including hybrid vehicles, boats and ships and robots. The fuel cell system is also applicable to the heating system in various constructions including buildings and houses, with using the fuel cell stack 10 as the stationary power source.

D7. Modification 7

The air is used for the oxidizing gas according to the respective embodiments, but any oxygen-containing gas other than the air may be used for the oxidizing gas.

D8. Modification 8

In the above embodiments, part of the software configuration may be replaced by hardware configuration. On the contrary, part of the hardware configuration may be replaced by software configuration.

REFERENCE SIGNS LIST

10 Fuel Cell Stack
15 Ammeter
16 Temperature Sensor
31 Hydrogen Tank
32 Air Compressor
33 Radiator
34 First Power-Driven Fan
35 Heat Exchanger
36 Heater Core
37 Second Power-Driven Fan
42 Shut-off Valve
43 Hydrogen Gas Supply Valve
44 Bypass Valve
45 Pressure Regulator
46 Purge Valve
47 Circulation Pump
48 First Coolant Pump
49 Second Coolant Pump
51 Hydrogen Gas Supply Line
52 Anode Off-gas Exhaust Line
53 Hydrogen Gas Bypass Line
54 Air Supply Line
55 Cathode Off-gas Exhaust Line
56 Air Bypass Passage
60 Control Unit
61 CPU
61a Operation Controller
61b Air Compressor Controller
61c Valve Controller
61d Heating Controller
62 RAM
63 ROM
63a Rotation Speed Map
63b I-Q Map
63c I-P Map
63d Pressure Regulator Opening Map
63e Bypass Valve Opening Map
91 First Coolant Line
92 Second Coolant Line
93 Third Coolant Line
94 Fourth Coolant Line
95 Fifth Coolant Line
96 Sixth Coolant Line
97 Seventh Coolant Line
69 Coolant Bypass Passage
71 FC-Requiring Air Amount Calculator
72 Pressure Regulator Opening Determiner
73 Pressure Regulator Opening Notifier
74 Feedback Amount Determiner
81 Air Compressor Flow Rate Calculator
82 Bypass Valve Opening Determiner
83 Bypass Valve Opening Notifier
84 Air Compressor Flow Rate Notifier
98 Converter Voltage Controller
99 Three-way Valve
100 Fuel Cell System
111 Front Seats
112 Rear Seats
200 Motor
CA Vehicle Interior
SP Operation Panel
EC Electric Vehicle
SW Maximum Heat-up Switch

The invention claimed is:

1. A fuel cell system, comprising:
a fuel cell;
an operation controller configured to control operation of the fuel cell;
an air-conditioning mechanism configured to execute heating by using exhaust heat of the fuel cell, the air-conditioning mechanism including a coolant circulation path that passes through the fuel cell and a heater core that has a temperature rise by the heat of the coolant flowing through the coolant circulation path, wherein
an oxidizing gas supplier including an air compressor and being configured to supply an oxidizing gas used for power generation of the fuel cell to the fuel cell;
an oxidizing gas supply line configured to connect the oxidizing gas supplier with the fuel cell;
a cathode off-gas exhaust line configured to discharge cathode off-gas from the fuel cell;
a bypass line configured to connect the oxidizing gas supply line with the cathode off-gas exhaust line; and
a flow control valve configured to regulate a flow rate ratio of a flow rate of the oxidizing gas flowing through the oxidizing gas supply line to the fuel cell to a flow rate of the oxidizing gas flowing through the oxidizing gas supply line to the bypass line out of the oxidizing gas supplied from the oxidizing gas supplier,
wherein in response to a heating request for the air-conditioning mechanism during ordinary operation where the fuel cell is operated at an operating point on a current-voltage characteristic curve of the fuel cell, the operation controller compares a heat value-based required current value with an output-based required current value, wherein the heat value-based required current value is a current value of an operating point that is located on the current-voltage characteristic curve and satisfies a required heat value for the fuel cell, wherein the output-based required current value is a current value of an operating point that is located on the current-voltage characteristic curve and satisfies a required output for the fuel cell,
wherein when the output-based required current value is equal to or greater than the heat value-based required current value, the operation controller is configured to change a supply amount of the oxidizing gas supplier according to a change in the output-based required current, wherein when the output-based required current value is smaller than the heat value-based required current value, the operation controller is further configured to fix the supply amount of the oxidizing gas supplied from the oxidizing gas supplier to a supply amount that satisfies the heat value-based required current value on the current-voltage characteristic curve, regardless of the change in the output-based required current, and wherein the operation controller regulates the flow control valve to adjust a flow rate of the oxidizing gas toward the fuel cell.

2. The fuel cell system according to claim 1:

wherein when the output-based required current value is equal to or greater than the heat value-based required current value, the operation controller causes the fuel cell to be operated at an operating point on the current-voltage characteristic curve, wherein when the output-based required current value is smaller than the heat value-based required current value, the operation controller performs operation-for-heating control that controls operating point of the fuel cell to an operating point of lower power generation efficiency than that of the operating point on the current-voltage characteristic curve of the fuel cell, and wherein the operation controller adjusts the flow control valve to shift the operating point of the fuel cell to a required operating point that is an operating point satisfying both the required heat value and the required output.

3. The fuel cell system according to claim 2, further comprising:

an ammeter configured to measure a current value of the fuel cell, wherein at a start of the operation-for-heating control, the operation controller adjusts the flow control valve to supply a lower flow rate of the oxidizing gas, which is lower than a flow rate of the oxidizing gas to satisfy a current value of the required operating point out of the oxidizing gas supplied by the oxidizing gas supplier, to the fuel cell, when the current value of the fuel cell measured by the ammeter is greater than the current value of the required operating point, the operation controller then adjusts the flow control valve to decrease the flow rate of the oxidizing gas supplied to the fuel cell, and when the current value of the fuel cell measured by the ammeter is smaller than the current value of the required operating point, the operation controller then adjusts the flow control valve to increase the flow rate of the oxidizing gas supplied to the fuel cell.

4. The fuel cell system according to claim 2, further comprising:

a fuel cell temperature acquirer configured to acquire temperature of the fuel cell; and a heating space temperature acquirer configured to acquire heating space temperature that is temperature of a space as heating target by the air-conditioning mechanism, wherein at a start of the fuel cell, the operation controller performs start-time warm-up operation control that is control to lower the power generation efficiency of the fuel cell than that in the operation-for-heating control, the operation controller has a first operation-for-heating mode that, in response to a heating request for the air-conditioning mechanism during the start-time warm-up operation control, terminates the start-time warm-up operation control, when the heating space temperature reaches a temperature to satisfy the heating request after the temperature of the fuel cell reaches a predetermined warm-up end temperature, after termination of the start-time warm-up operation control, the operation controller compares the heat value-based required current value with the output-based required current value, when the output-based required current value is equal to or greater than the heat value-based required current value, the operation controller controls the fuel cell to be operated at an operating point on the current-voltage characteristic curve, and when the output-based required current value is smaller than the heat value-based required current value, the operation controller performs the operation-for-heating control.

5. The fuel cell system according to claim 4, further comprising:

a user interface, wherein in addition to the first operation-for-heating mode, the operation controller has a second operation-for-heating mode that, in response to the heating request for the air-conditioning mechanism during the start-time warm-up operation control, terminates the start-time warm-up operation control when the temperature of the fuel cell reaches the warm-up end temperature, and the user interface enables a user to select the operation-for-heating mode performed by the operation controller between the first operation-for-heating mode and the second operation-for-heating mode.

* * * * *